(12) United States Patent
Stillman et al.

(10) Patent No.: US 7,725,501 B1
(45) Date of Patent: May 25, 2010

(54) SYSTEM AND METHOD FOR RAPID DATABASE APPLICATION DEPLOYMENT AND USE

(75) Inventors: Jerry M. Stillman, Lorton, VA (US); David J. Mettenburg, Berryville, VA (US); Dayle S. Yamatani, Reston, VA (US); Patrick E. Hinnershitz, Leesburg, VA (US); John E. Essing, Alexandria, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 493 days.

(21) Appl. No.: 11/271,923

(22) Filed: Nov. 14, 2005

Related U.S. Application Data

(60) Provisional application No. 60/626,868, filed on Nov. 12, 2004.

(51) Int. Cl.
G06F 7/00 (2006.01)
(52) U.S. Cl. ...................................... 707/805; 707/793
(58) Field of Classification Search ................. 707/101, 707/102, 103 R, 103 X, 103 Y, 103 Z
See application file for complete search history.

(56) References Cited

U.S. PATENT DOCUMENTS

| | | | | |
|---|---|---|---|---|
| 5,721,912 | A * | 2/1998 | Stepczyk et al. | 707/102 |
| 5,920,725 | A * | 7/1999 | Ma et al. | 717/171 |
| 5,950,190 | A * | 9/1999 | Yeager et al. | 707/3 |
| 6,012,067 | A * | 1/2000 | Sarkar | 707/103 R |
| 6,163,878 | A * | 12/2000 | Kohl | 717/100 |
| 6,199,059 | B1 * | 3/2001 | Dahan et al. | 707/3 |
| 6,247,020 | B1 * | 6/2001 | Minard | 707/104.1 |
| 6,418,448 | B1 * | 7/2002 | Sarkar | 707/104.1 |
| 6,704,806 | B1 * | 3/2004 | Decker | 719/324 |
| 6,968,346 | B2 * | 11/2005 | Hekmatpour | 707/104.1 |
| 2002/0002603 | A1 * | 1/2002 | Vange | 709/219 |
| 2002/0091702 | A1 * | 7/2002 | Mullins | 707/100 |
| 2004/0044987 | A1 * | 3/2004 | Kompalli et al. | 717/100 |
| 2005/0234889 | A1 * | 10/2005 | Fox et al. | 707/3 |
| 2005/0273705 | A1 * | 12/2005 | McCain | 715/513 |

* cited by examiner

OTHER PUBLICATIONS

Building user interfaces for database applications, Borra et al, SIGMOD vol. 21, No. 1, Mar. 1992.*

*Primary Examiner*—Pierre M Vital
*Assistant Examiner*—Augustine Obisesan
(74) *Attorney, Agent, or Firm*—Andrews Kurth LLP

(57) ABSTRACT

A system and a method for rapid database application deployment and use. A system includes a host server that includes a database and a database application framework. The database stores a virtual relational database structure and a virtual relational database implementation. The database may store the virtual relational database structure and virtual relational database implementation in an existing relational database structure. The virtual relational database structure includes one or more object types and one or more object properties. Object types are definitions of types of objects for which data may be stored in the database and object properties are definitions of types of data that may be stored for objects and are associated with the one or more object types. The virtual relational database implementation includes one or more actual objects that are based on the one or more object types and one or more populated properties that are based on the object properties and which include data for the one or more actual objects. The database application framework enables a user to define virtual relational database structures and create virtual relational database implementations. The database application framework communicates with the database and includes user interface software that creates and processes user interface displays that enable a user to view, edit and search the database and which adapt to changes to the virtual relational database structure to immediately reflect such changes on the user interface displays.

15 Claims, 19 Drawing Sheets

(1 of 3)

(1 of 2)

(2 of 2)

SYSTEM AND METHOD FOR RAPID DATABASE APPLICATION DEPLOYMENT AND USE

RELATED APPLICATION(S)

The present application claims the priority of U.S. Provisional Application Ser. No. 60/626,868, entitled "METHOD AND SYSTEM FOR RAPID DATABASE DEVELOPMENT," filed Nov. 12, 2004 ("the '868 provisional"), which is hereby incorporated, in its entirety, by reference.

BACKGROUND

Implementation of relational databases and user interfaces typically requires a close coordination between domain information/subject matter experts, database developers/engineers, and software application developers/engineers to create a responsive database and user interface that meets the needs of a given end-user. From the users' perspective, the combined functionality of underlying system operating system, relational database engine, defined constraints, data relationships, data structure, and the complete family of user interface screens required for viewing, editing, and searching are often collectively referred to as "a database." From the technical perspective, the end product is typically the result of complex, planned integration and software development activities required to (1) define and (2) build required relational database structure (e.g., required database tables, columns, constraints, views, sequences, grants, rules and other database elements) within the relational database using a specifically designed database language (e.g., a structured query language), and then to (3) design a suitable user interface environment using applicable software programming languages (e.g., VisualBasic, HTML, Java, C, etc.) to develop a number of interrelated user interface screens and/or pages whereby a user can perform required functions. A relational database is a database in which the database is perceived by its users as a collection of tables and operators at the user's disposal (e.g., for data retrieval) are operators that generate new tables from old. See, e.g., "An Introduction to Database Systems," C. J. Date, Vol. I, Fourth Edition, pg. 20 (1986).

Note that the user interface design and development (step 3) usually includes high level design, detailed design, coding, testing, system integration, and deployment phases. As such, the user interface design and development is usually the most time consuming activity. As a simple example, a complete database and user interface effort might require two (2) months to derive the database structure (step 1), one (1) month to implement the structure (step 2), and twelve (12) months to create the user interface (step 3). Moreover, after the database and user interface development is completed, any required data structure changes will necessitate a repeat of all three steps, although typically at a smaller scale than the original development effort. Such changes and iterations are normal during the lifetime of any database application.

Common Complexities in Database Development

User input received from the developed user screens, such as search parameters, data editing requests, and data additions or deletions, are communicated to the underlying relational database engine for action, then results are received from the database for display to satisfy the initiating user request. This input is validated through data checking and rule application. Errors must be handled by the application where they originate from the operating system, the database, the interface application software, or user input. Additionally, if the database application is intended to support distributed use by separate classes of users (e.g., edit, view, "super user"), additional structure, logic, screens, and security mechanisms must be in place to create, manage, and protect information related to user accounts, privileges, and accountability. In a government mandated secure data environment, e.g., decreed by DoD Directive DCID 6/3, the operating system, database, and user environment additionally detect, manage, process, and protect individual database elements based on a security classification labeling model. Information retrieval in this data environment includes capabilities to determine the level of classification a user may receive, and restrict data retrieved from the relational database for display to a level not exceeding the user's authorized level.

A Nominal Database Development Approach

A conventional approach to database and user interface development following the described model would entail dedicated time between technical staff (e.g., database and software engineers) and the information domain/subject matter experts in developing an information hierarchy, model, and general rule set. A formal relational data structure would then be built based on this knowledge containing the required data tables, linking tables, constraints, rules, and triggers required to maintain data integrity throughout the planned database lifecycle. User interface screens would be typically developed by separate software specialists to provide the required user functionality, display characteristics, and input validation, with integration of each screen into a composite application directly linked to the underlying database structure. Deployment of the initial database application would entail exhaustive testing of data entry, retrieval, error trapping, desired application flow, and an initial population with test or demonstration data. If the database application is required to operate in a secure environment, e.g., a DoD mandated secure environment, specific tests demonstrating handling, protection, storage, and retrieval of classified data will additionally be necessary prior to end user delivery. Upon successfully demonstrating the database and its associated user interface screens meet the user's test criteria, the database may be declared formally available for end-user training and the initial population begins.

A typical deployment of a database and application will result in user-identified errors and requests for changes in the interface, functionality, or underlying data structure. To accommodate these requests, or correct errors, the development team must identify the source, if an error, and correct it through recoding and recompiling, or for change requests, modify the database or user interface elements through redesign, recoding, and recompiling, prior to deploying a next version of the database application. Depending on the severity of the error, or the significance of the requested change, this may entail a complete halt in use of the database during the maintenance period, resulting in a loss of productivity where use of the database was required. This cycle of error/change, identification, modification, change, and redeployment must occur to some degree for nearly any adjustment in the deployed database application. Changes in the underlying data structure must be reflected in updates to user interface screens and options. Changes required in the user interface, may or may not impact the underlying logic or constraints of the data structure, but thorough examination and testing must demonstrate this prior to redeployment.

Consequently, the conventional approach for developing and deploying an integrated user interface and supporting relational database infrastructure requires substantial planning, design, development, and testing prior to delivery to the end user. In many cases, particularly in government functional domains, the underlying information domain or required data content may substantially change during the course of the development process. This results in an immediate need to begin redesign, integration, and test as soon as the database is officially declared an operational capability. In other cases, the cost of the time required to follow a conventional database development process cannot meet the need for relational database and user interface support required for the critical analyses or operational tasks increasingly common in government and commercial activities today.

SUMMARY

An advantage of the embodiments described herein is that they overcome the disadvantages of the prior art. These advantages and others are achieved by a system that includes a host server, the host server containing a database and a database application framework. The database stores a virtual relational database structure and a virtual relational database implementation. The database may store the virtual relational database structure and virtual relational database implementation in an existing relational database structure. The virtual relational database structure includes one or more object types and one or more object properties. Object types are definitions of types of objects for which data may be stored in the database and object properties are definitions of types of data that may be stored for objects and are associated with the one or more object types. The virtual relational database implementation includes one or more actual objects that are based on the one or more object types and one or more populated properties that are based on the object properties and which include data for the one or more actual objects. The database application framework enables a user to define virtual relational database structures and create relational database implementations. The database application framework communicates with the database and includes user interface software that creates and processes user interface displays that enable a user to view, edit and search the database and which adapt to changes to the virtual relational database structure to immediately reflect such changes on the user interface displays.

These advantages and others are also achieved by a computer readable medium for rapid database application deployment and use. The computer readable medium includes a database application framework that enables a user to define virtual relational database structures and create virtual relational database implementations. The database application framework includes user interface software that creates and processes user interface displays that enable a user to view, edit and search a database and which adapt to changes to the virtual relational database structure to immediately reflect such changes on the user interface displays.

These advantages and others are also achieved by a computerized method for rapid database application deployment and use. The method includes creating a virtual relational database structure, implementing a virtual relational database based on the virtual relational database structure, and outputting data from the virtual relational database on an adaptable web page. The creating of the virtual relational database structure includes receiving a user definition of the virtual relational database structure on a web page and processing the user definition of the virtual relational database structure. The implementing of a relational database includes receiving user input on a web page and processing the user input and storing the data in the relational database. The outputting includes retrieving the relational database structure, including any changes made to the relational database structure, and creating the adaptable web page with the data. The creating creates an adaptable web page that displays the data and that reflects changes to the relational database structure without requiring any additional user action.

These advantages and others are also achieved by a computerized method for rapid database application deployment and use. The method includes creating a virtual relational database structure and implementing a virtual relational database based on the relational database structure. The creating of the virtual relational database structure includes receiving a user definition of the virtual relational database structure on a web page, creating one or more user-defined object types based on the received user definition and creating one or more user-defined object properties based on the received user definition. The object types are definitions of types of objects for which data may be stored in the virtual relational database. The object properties are definitions of types of data that may be stored for objects and are associated with the one or more object types. The implementing of a virtual relational database includes receiving user input on a web page, creating one or more actual objects based on the received user input, and creating one or more populated properties based on the received user input. The one or more actual objects are based on the object types in the relational database structure and the one or more populated properties are based on the object properties and include data for the one or more actual objects.

DESCRIPTION OF THE DRAWINGS

The detailed description will refer to the following drawings, wherein like numerals refer to like elements, and wherein.

DETAILED DESCRIPTION

Figure 1:
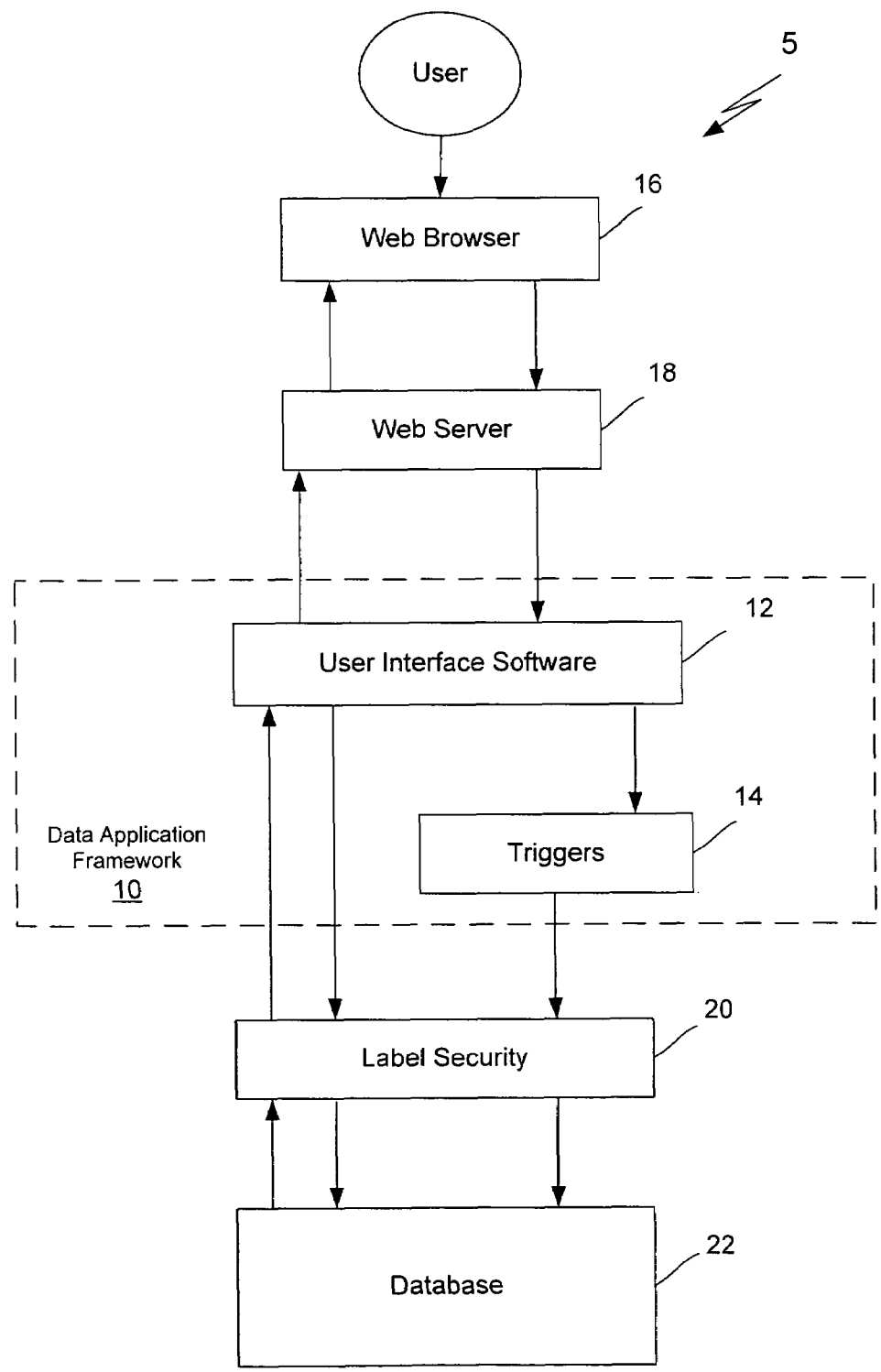
FIG. 1 is a block diagram of software components of an embodiment of a system and method for rapid database application deployment and use.

A system and method for rapid database application deployment and use are described herein. Embodiments of the system and method for rapid database application deployment and use may be implemented by a database application framework. Database application framework mitigates the shortfall of database development through a unique and novel solution. The database and software development required for both the underlying database structure and user interface have been integrated in database application framework, a user-driven application, optimized to support a dynamic information environment as described herein. Database application framework provides end users with capabilities to define and deploy a virtual relational database structure and user interface in concert with their increasing awareness of their specific information domain and database needs. Embodiments of database application framework implement an underlying, existing relational database structure which allows the user to create virtual relational database structures and virtual relational database implementations/applications.

A virtual relational database structure is a collection of information presented to a user which appears as it would in a conventional relational database, but which is stored and manipulated in a non-conventional manner. The virtual structure allows for conventional user actions such as viewing, editing (insert/update/delete), and searching.

The database application framework presents virtual relational database structures, and virtual relational database implementations based thereupon, created using the database application framework, so that they appear as conventional relational databases. The interface created by the database application framework allows users to view, edit, and search virtual relational database structures and virtual relational database implementations created therewith. However, the database application framework stores and manipulates virtual relational database structures in a non-conventional manner. Embodiments of the database application framework store the virtual relational database structures in an existing, static relational database structure. The existing, static relational database structure includes pre-defined, existing tables for storing components that make up the virtual relational database structures (e.g., object types, objects, categories, properties). Embodiments include a set, pre-defined number of tables for each component; generally, there is one table for each component (e.g., an embodiment includes one "object type" table, one "objects" table, one "categories" table, etc.), although some components may have two or more tables (e.g., an embodiment may include two "property" tables). An exemplary listing of the pre-defined, existing tables in an embodiment of database application framework is shown in Appendix A attached hereto.

A virtual relational database implementation is an implementation or application of a virtual relational database structure created using database application framework. Although discussed as separate from the virtual relational database structure, the virtual relational database implementation is stored with the virtual relational database structure. For each implementation, the virtual relational database comprises the virtual relational database structure (e.g., object types, properties, object categories, etc.) and the virtual relational database implementation (e.g., objects, populated properties, etc.) created therewith. The point of discussing the virtual relational database implementation separately from the virtual relational database structure (e.g., object types, object properties, object categories, etc.), is that a set of object types, object properties and object categories may be created and then used in multiple, different virtual relational database implementations (i.e., with different objects, populated properties, etc.).

As database application framework is used, there are no changes made to the existing, static relational database structure. The pre-defined tables will not be changed in any way as a result of or by user actions, other than database application framework adding rows of data corresponding to, e.g., new object types, objects, categories, properties, and other data input by the user. Users cannot add columns to the pre-existing tables, cannot add new tables to the existing, static relational database structure, and cannot change relationships between the pre-defined, existing tables. For example, as a user creates a new object type using database application framework and the included database interface (e.g., using the web page interfaces described below), the new object type created by the user will be processed by database application framework and added to the pre-existing object types table as a new row of data. Each instance of database application framework will include the same existing, static relational database structure. Only structural changes made to this existing, static relational database structure would be as a software update to database application framework in which new pre-defined tables were added to correspond to new types of components for the virtual relational database structure, or similar changes. These changes would not be made by end-users of database application framework.

Database application framework may include a database and web interface that (a) allows end users to define and change the structure of a virtual relational database to suit their needs and (b) provides editing (insert/update/delete), viewing, and searching user interface (i.e., database access) web pages that immediately adapt to any changes in the structure without the need to rewrite, recompile, or in any way change the web page software. This allows for the rapid standup of a database and user interface application/implementation without the need for database or software engineers. Database application framework allows a user to rapidly develop secure database applications, without database or software modifications or the need for database and software engineers Rather than following a conventional approach requiring database and software specialists to design and develop a structure and user environment based on defined information needs, database application framework provides the user a capability to "populate through participation" the information structure based on a pre-designed, tested, and deployed generalized data model, structure and user-interface. Database application framework provides capabilities for definition, storage, retrieval, and modification of required data and user display elements.

Database application framework enables users to begin building their database application even if they cannot completely define their data requirements for the database itself. As those needs evolve, database application framework provides users the ability to dynamically update the data structure, relationships, and desired display formats. Database application framework user interface adapts to changes made in structure, display formats, or entity relationships the moment the change is made. User interface screens providing browsing, editing and search functions automatically reflect these changes once saved in the database. Database application framework effectively eliminates the need for lengthy, costly software design, development, and test stages from database deployment, use, and maintenance. Changes to virtual database structure are immediately reflected in the user interface without the need to repeat the steps (1), (2), and (3) described above (see Background).

Database application framework eliminates the need for database engineers in the database definition and creation steps (steps 1 and 2) and simplifies the database structure development steps by providing a simple but powerful general purpose database model that end users can understand and manipulate as necessary by themselves to fit their needs. Database application framework completely eliminates the user interface design and development step (step 3) by creating intelligent editing, viewing, and searching web pages that automatically react and conform to the database structure that the user has implemented.

With database application framework, the database and user interface development activities are as follows:

1. Database Definition: Subject matter experts and/or end users work together to derive the underlying structure of the database.

2. Database Creation: End users implement the derived database structure from step 1 via database application framework structure definition web pages to create a virtual relational database implementation.

Upon completion of a new database creation step (step 2), database application framework web pages that allow end users to edit, view, and search (i.e., use) the database are immediately available because these pages adapt themselves to the new structure. Indeed, an entire new database implementation need not be completed before a user can edit, view, and search the database. In other words, a user may define a portion of the database structure (step 1), input some data (i.e., implement the derived database structure to create some portion of the database (step 2)), and immediately begin editing, viewing, and searching the database. While using the database, the user may define further portions of the database structure and input additional data to further populate the database, with such changes being immediately reflected in the user interface web pages generated by database application framework and used by the user to edit, view and search the database.

Accordingly, a primary advantage of the system and method for rapid database application deployment and use is the significant savings of time, money, and resources. The savings occurs because the end users can implement and change their structure themselves as needed without having to wait for and pay for database and software engineers to implement a new structure and the corresponding web pages.

Consequently, database application framework is ideally suited for situations, for example, in which: (a) users do not have a clear and thorough understanding of their data structure requirements, and therefore need a structure and user interface that is flexible and that can adapt to new or changing needs; (b) users do not have the time, money, and/or resources (database and software engineers) required for a typical custom database and interface development effort; (c) users wish to prototype a database structure in a proof-of-concept mode prior to committing to a long database and interface development effort; and, (d) users wish to field a database and user interface immediately while developing a customized database and interface in parallel.

With reference now to FIG. 1, shown is an embodiment of a system for rapid database application deployment and use 5. System 5 includes database application framework 10. As shown, database application framework 10 may be implemented as a user-driven software application comprising stored code, and may include user interface software 12 and triggers 14. In the embodiment described herein, the user interfaces are web pages, although other user interfaces may be used. The web pages may include various web pages such as are described below and shown in the '868 provisional, which is incorporated by reference above. User interface software 12 may include creator and receiver modules or programs for creating and receiving data from database interface web pages. These programs may be, for example, server side include (SSI) or common gateway interface (CGI) programs. In the embodiments described herein, user interface software 12 is implemented as creator and receiver CGI programs, which are discussed below. Each web page provided by database application framework 10 for database interface may have its own dedicated creator and/or receiver CGI programs.

Accordingly, system 5 shown includes web browser 16, web server 18, optional database label security application 20 and database 22. The database 22 may include the relational database structure implemented by database application framework to create virtual relational database structures and virtual relational database implementations.

Hence, the database 22 may store virtual relational database structures and virtual relational database implementations (the data). The following is a description of the use of the embodiment of system 5 shown in FIG. 1.

Data Display/Browsing/Viewing

Once database application framework 10 is installed and running on a computer (e.g., a server), a user of system 5 may interact with database application framework 10 through the web browser 16 to create a virtual relational database structure and a virtual relational database implementation. Users select specific functions from predefined links on database application framework web pages, and/or enter data and submit the request to database application framework 10. Information from the user is transferred from web browser 16 (e.g., through a URL) which sends a request to system web server 18, to produce a specific action. The action may entail web server 18 transmitting a specific request to database application framework 10 to activate user interface software 12 (e.g., a specific CGI program) to act on input from the user request. If access to database 22 is not required, the user request is satisfied by executing designated user interface software 12 to handle the user request, then executing user interface software 12 to generate data (e.g., HTML data) for submission to web server 18, for creation and display of the resulting web page to the user on web browser 16.

When user requests require data retrieval from database 22, user interface software 12 creates the appropriate database request message or query (e.g., a Structured Query Language (SQL) statement). If database label security application 20 is present (i.e., database application framework is operating in an active row-labeling security environment), database application framework 10 submits the database request message to database label security application 20 (e.g., ORACLE®'s label security application). If required, database label security application 20 interprets the information request and queries database 22 for the required data. In a non row-labeling security environment, the database request from database application framework 10 is passed directly to database 22. In the row-label security environment, the queried data returned from database 22 is further interpreted by database label security application 20 to determine what data elements meet the original user request, based on user security access. This resulting dataset is returned to appropriate user interface software 12. User interface software 12 then performs required processing of the data to generate the data (e.g., HTML data) for submission to web server 18 and display as a web page on web browser 16. Web server 18 receives the database application framework 10 generated data file and passes the resulting web page display file to web browser 16 for user display.

User Database Query

Users may select specific database application framework 10 edit functions from predefined links on a database application framework 10 web page. Information from the user is transferred from web browser 16, e.g., through a URL which sends a request to system web server 18, to produce a specific action. User edit requests require specific data retrieval and insertion in database 22, provided by user interface software 12. Software in database application framework 10 executes in response to the user edit request and creates the appropriate database requests and submits the requests to database label security application 20, if database application framework 10 is operating in an active row-labeling security environment. If required, database label security application 20 interprets the information request and queries database 22 for the required data. In a non row-labeling security environment, the database request from database application framework 10 is passed directly to database 22. In the row-label security environment, the queried data returned from database 22 is further interpreted by database label security application 20 to determine what data elements meet the original user request, based on user security access. This resulting dataset is returned to appropriate user interface software 12. User interface software 12 then performs required processing of the data to generate the data (e.g., HTML data) for submission to web server 18 and display as a web page on web browser 16. Web server 18 receives the database application framework 10 generated data file and passes the resulting web page display file to web browser 16 for user display.

User Database Modification

A user edit display web page provides options for modification, deletion, and/or addition of data in database 22. This data includes both information describing the virtual database content and structure. Any changes to the structure or content of the database requires execution of single or multiple combinations of one or more database application framework 10 edit functions.

Edit requests passed from the user through web browser 16, e.g., through a URL, to web server 18, activate specific user interface software 12 in database application framework 10 designed to perform data receipt functions. User interface software 12 executes, interprets the requested action, and forms a structured language statement for database update, which is passed to database application framework triggers 14. Triggers 14 are integrated as integral elements of the database to ensure data integrity is maintained. A specific set of database triggers 14 automatically verifies the database update request for data content, data validity, and format. A second set of triggers 14, identified as Cascading Row-label Triggers, specifically execute if database application framework 10 is implemented in a row-labeling security environment. These triggers parse and validate the security labels of the update request, determine the required row-label security required for existing and new database rows based on implementation of the requested change, and submit the resulting data set to the database 22 for final database update. The results of the user requested database update are then displayed following steps described previously for display/browsing/viewing.

Object/Property Data Model

Embodiments of system 5 are used as described above to both develop and use (e.g., edit, view, search) a relational database. By using database application framework 10, a user can define the virtual database structure of their relational database as they choose. Moreover, the user can begin using their database without completely defining the virtual database structure. In other words, the user can partially define the database structure and begin using the database. Database application framework 10 enables this by allowing users to: define the types of things—objects—they want the database to store (after defining, the user can then create objects of those types); define what types of information they want the database to store for those objects (after defining the types of information, the users can then enter data for those objects); and associate objects together and define the relationships between those objects. Consequently, embodiments of system 5 are centered around two core concepts: objects and properties.

An object is an individual entity that stored data is to be related with. Examples of objects are employees, satellites, buildings, cars, students, computers, books, etc. In a typical database, additional entities can be added simply and quickly to database tables. However, there are usually rigid constraints on the types of entities (i.e., types of objects) that can be stored in each table. For example, if a company's database stored information about employees, departments, projects, etc., and at some point needed to store information about company vehicles and what employees were using them, the new information could not be easily added because there would be no structure and user interface designed to support the addition of vehicles. Within system 5, "object types" may be defined by any appropriately authorized end user. In the same company database example using database application framework 10, a user would create a new object type called "vehicles" and all appropriately authorized users would be able to create objects that are vehicles and add them to the database. Variable object types allow database application framework 10 to support completely different database information domains and to change very easily and quickly when required. Once an object type is created (or changed), database application framework 10 user interfaces (e.g., web pages) immediately adapt to support the object type (or its changes).

Underneath object types, users can create object categories. Object types provide a first level grouping of objects, and object categories provide a second level. For example, if the "vehicles" object type existed, the object categories "cars," "vans," and "trucks" could be created to subdivide "vehicles." This provides an aid to the user when trying to find related objects of interest.

In order to keep the concept of an object generic, a minimal amount of information is required to create an object. Each object must have a unique name (different from every other object name in the database), must be assigned an object type (from the list of user defined object types), and must be assigned an object category (from the list of user defined object categories).

A property is a group of related pieces of data that is stored related to an object. For example, for an employee in the previous example, a requirement may exist to store the social security number, hire date, position, and manager. For a vehicle object, the requirement may be to store the manufacturer, model, year, VIN, license number, and color. From a user's point of view a property is essentially the same as a database table. A property has defined columns (manufacturer, model, year, etc.) and when data is entered into a property it is entered into rows.

Whereas in a typical database and user interface development a database engineer would create the required tables, with database application framework 10 the end user creates the properties, e.g., via database application framework 10 property definition web pages. The user provides the name of the property, some information about how the property is to be displayed, and information about each column in the property. The column information includes such data as column name, data type, size, input format, units, minimum/maximum allowed value, and metadata (data about the data) storage options for priority, source, comment, timestamp, and user name. This property information is very similar to what would be required to create an actual database table in a database design phase. This information about the property is completely stored in database 22.

Figure 2:
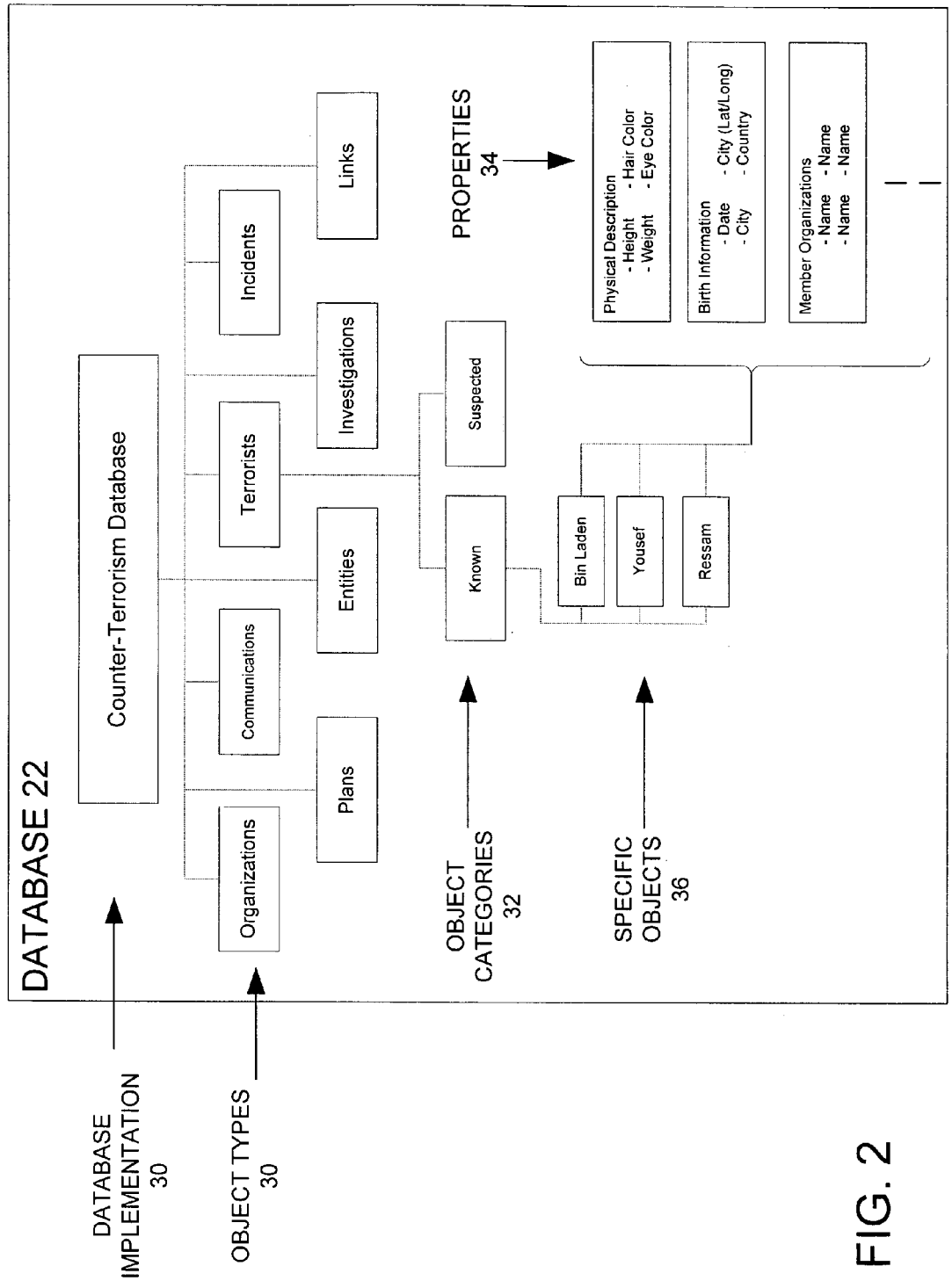
FIG. 2 is a block diagram of logical components of implementation of a relational database developed using an embodiment of a system and method for rapid database application deployment and use.

With reference now to FIG. 2, shown is a block diagram illustrating logical components of an implementation of a relational database created using database application framework 10. As illustrated, the logical components are all stored in database 22. Other virtual relational database implementations created using the same database application framework 10 may be stored in the same database 22. The virtual relational database implementation or application 30 in the example shown is a Counter-Terrorism Database. Relational database 30 includes object types 32 and properties 36 that were defined by a user and created and stored in database 22 by database application framework 10. Relational database 30 may also include object categories 34 that were defined by a user and created and stored in database 22 by database application framework 10. After an object type 32 is created, a user may create one or more individual objects 38 of that object type 32. Each object type 32 may include one or more properties 36 associated to the object type 32. Whenever an individual object 38 is created, the object 38 may be associated with one or more of the properties 36 associated to its object type 32.

Entering Property Data

In order to enter data for an object, a user first selects (e.g., on a database application framework 10 web page) the object to enter data for and the property that defines the appropriate type of data the user wishes to enter. For example, if an employee object named "John Smith" was created and if a property called "Employee Hiring Info" (containing columns for social security number, hire date, position, and manager) was created, the user would select the "John Smith" object and the "Employee Hiring Info" property to associate the object and the property together.

An object property editing page that provides for property data entry (in this case, the actual social security number, hire date, position, and manager for John Smith) examines the property definition (column names, data types, sizes, input formats, etc.) and displays the appropriate input fields for each property column in order to allow data entry and/or data modification by the user. Because the object property editing page is utilizing the stored property definition to determine what fields to display, the page can accommodate any property definition (any number of columns with any combination of the various allowed data types) and can immediately accommodate any changes the user makes to a property definition. For example, if the user enters data into the "Employee Hiring Info" property for 500 different employee objects resulting in 500 new rows of data, and then adds a salary column to the property, the next time the object property editing page is displayed with this property, salary will be allowed to be entered. As with typical databases, the initial 500 rows would not contain salary information since that was not an option during data entry, but the user could re-edit those rows to add such data. Of significance is that the object property editing page did not require modifying or recompiling or change in any way to accommodate the new salary column. Other types of changes such as switching column positions or changing a column's name, size, input format, or minimum/maximum allowed values are also immediately accommodated by the object property editing web page.

Multiple Values Per Cell

Whereas typical database tables only allow a single value per cell (a cell is the intersection of a row and a column in a database table), database application framework 10 allows multiple values to be stored in a cell. If, for example, a "degree" column was added to the "Employee Hiring Info" property above, a user could enter "BS—Computer Science" and "MS—Business Administration" in the "degree" cell for a specific employee. These two items would physically be stored as separate values in the underlying database application framework 10 structure (in database 22) not as two text strings concatenated together into one large string value. In database application framework 10 the two values then would appear together in a single cell when viewed by the user.

Viewing Object Property Data

An object display page (which displays all data about a single object) works in a similar manner as the object property editing page in that it examines the definition of each property associated with an object being displayed and displays the user entered data for each property accordingly. If the salary column mentioned above were to be added to a property, the next time this property was displayed that column would appear, albeit empty (until the user enters salary data into those property rows previously added). Whereas the object property edit page is formatted in a "database-ish" manner to accommodate data entry, the object display page is designed to present property data in a simple, user-friendly table or list format.

Property Data Storage

The creation of a property does not cause the creation of an actual database table. In fact, in the embodiment shown in FIG. 1, user actions do not cause any database tables to be created when using database application framework 10. In the embodiment, all data—object types, object categories, individual objects, property definitions, actual property data, and all other database application framework 10 data—is stored in a pre-existing table structure (e.g., the existing relational database structure mentioned above) within database 22. In this embodiment, object types are stored in a table, object categories are stored in a different table, and objects are stored in yet another table. Likewise, property definitions are stored in two tables, a first table that stores information about the property as a whole (e.g., the property name, how it is to be displayed, where it is to be displayed in relation to other properties, etc.) and a second table that stores information about each column in a property. This begs the question—if there is no table created to store data for a property, how is the data stored? The answer is that all property data (again, this is, for example, the actual social security number, hire date, position and manager for a specific employee object) is stored in a single table called the "object property cell values" table, which is maintained in database 22. To be clear, in the embodiment shown, all property data for all objects is stored in a single table. There are not separate tables for each object (that would require creating tables as new objects are created and, in this embodiment, there are no tables created as the result of user actions). For example, if an installation of database application framework 10 stored satellite data, terrorism data, employee data, and vehicle data, all property data for all objects (e.g., satellite objects, terrorism data objects, employee objects, vehicle objects) would be stored in one object property cell values table. Each row in this table is dedicated to storing exactly one property data value. Therefore, if a property contains four columns and one row of data is entered with one value in each column, then four actual table rows will be required to store that one row of property data. If column (1) has two values, column (2) has three values, column (3) has five values, and column (4) has seven values, then 17 rows (2+3+5+7) in the object property cell values table will be required to store that one row of property data. If a cell contains no values then no rows are stored in the table. Examples of tables that may be implemented by database application framework 10 and stored in database 22 are shown in the '868 provisional, which is incorporated by reference above.

Object Associations

In a typical database, relationships between the "things" you want to store data for must be determined during the database design. Table columns and/or entire tables are added to establish relationships. By default, the relationship data in a database usually only defines existence of a relationship and does not define the nature of the relationship. For example, a database can be defined to clearly indicate there is a relationship between employees and departments and between employees and vehicles, but it does not store the type or meaning of the relationships, such as "employees are in departments" or "employees use vehicles". That type of information is usually built into the software application that displays the data from the database, so that it can display the appropriate information to the user. An application would be coded so that any relationships between, for example, employees and departments by definition would mean the employees are in the departments and the departments contain the employees. These particular words ("are in," "contain") would generally not be in the database anywhere.

With database application framework 10, users can create relationships between any objects, and also define the nature of these relationships. So, for example, a user can create a relationship between the "John Smith" employee object and a "Dodge Van" vehicle object and can declare that "the employee uses the vehicle" (where "uses" defines the relationship type from the employee object's perspective) and that "the vehicle is used by the employee" (where "is used by" defines the relationship type from the vehicle object's perspective). Within system 5, relationships between objects are called object associations.

Sometimes it is sufficient to only indicate that a relationship exists between two objects. At other times it may be necessary to store extra information further describing the relationship. For example, it is probably sufficient to establish a relationship between an employee object and a department object and indicate that "the employee is in the department" and "the department contains the employee." However, when relating an employee object to a vehicle object, it may be necessary to store, for example, when the employee checked out the vehicle, when he returned it, and how many miles were driven. This is done by creating a special link object. The role of a link object is to define a relationship among two or more "regular" objects and to store some information related to that relationship. Because a link object is an object, it can utilize user defined properties as regular objects do. Therefore, properties can be created to store information about a relationship between objects, a link object can be created and associated to those properties, and the appropriate property data can be stored. The link object then "sits" between the related objects to identify the relationship and the associated supplemental information about the relationship.

Database Label Security and Triggers

With continued reference to FIG. 1, database label security application 20 may be used if database application framework 10 is operating in an active row-labeling security environment. An example security environment is if the relational database developed using database application framework 10 has security requirements in which access to data is restricted based on each user's assigned security clearance (e.g., confidential, secret, top-secret, etc.). Oracle Corporation provides an optional feature for its databases called Oracle Label Security (OLS)™. OLS is an exemplary database label security application 20. With a database label security application 20 such as OLS, every row of data in the database includes an extra "label" column that indicates the security clearance level that a user must have in order to access the row. Correspondingly, every user is assigned a clearance level. Whenever a user queries the database, database label security application 20 compares the user's clearance with the clearances of the possible rows to return and only returns those rows that the user is allowed to access. Database label security application 20 is completely automatic in that the queries against database 22 are exactly the same as those without database label security application 20. This insures that no query can be written to bypass database label security. The only difference is that with database label security application 20, when data is inserted into database 22 the label column value must be specified.

As mentioned above, database application framework 10 works with or without database label security application 20. When database label security application 20 is employed, triggers 14 written for database application framework 10 are utilized. A trigger 14 is a piece of custom software that a database executes automatically when a designated event occurs. For database application framework 10 with database label security application 20, the events the triggers trap are any insertions or updates of any tables. When such an event occurs, a trigger 14 executes to examine the data that is being inserted or updated. Specifically, any and all user-entered classification markings (entered either standalone or portion marking embedded at the beginning of a text paragraph) are extracted and an overall classification for the row being inserted or updated is calculated and set.

The use of triggers 14 instead of adding database label security-related code (e.g., OLS code) to user interface software 12 has two advantages. First, the normal interface (e.g., web page) code to insert and update data does not depend on whether database label security application 20 is employed or not. If database label security application 20 is implemented, triggers 14 take care of setting the label of a row upon insert or update. If not, triggers 14 simply skip all row label processing code. This simplifies user interface software 12 code (e.g., web page code) so that it does not need to act differently based on the presence or absence of database label security application 20. Secondly, using triggers 14 allows for labels to be correctly calculated and set regardless of how the data is being inserted or updated. Database application framework 10 is the primary application that will be inserting and updating data. But other applications could be written to access the same data, and a database administrator may have the ability to insert or update data via a variety of tools (e.g., Oracle tools) if necessary. Since triggers 14 are executed automatically by database 22 any time there is an insert or update, the triggers will handle database label security application 20 requirements regardless of the method used for data manipulation or user interface.

There are a variety of ways a database developer could implement triggers 14 to determine, set, and utilize the row label columns. The simplest method is to have the trigger 14 analyze the data to be inserted into a row and then determine the value of an overall row label. The information in the row would be sufficiently protected so only authorized users could access data in the row. This method, however, does not provide sufficient protection for data structures in a hierarchical situation. In a hierarchy, one table is dependent upon another. In a relational database it is normal for many hierarchical relationships of this kind to exist between tables.

To illustrate this situation, for the purposes of this discussion only, assume a typical database (i.e., not implemented with the database application framework 10) with one table with employee names ("Employees"), a second with project names ("Projects"), and a third indicating employee assignments for each project ("Assignments"). In this case, the Employees and Projects tables are "parent" tables and the Assignments table is the dependent or "child" table. Employees has columns for employee name and the classification of the employee name, Projects has project name and the classification of the project name, and Assignments has assignment name and the classification of the assignment name. (The name classification fields are text fields where users enter a textual classification such as "S" for Secret or "PROP" for Proprietary, etc. These columns are used to determine the classifications of the corresponding names.) For this example, employee name "John Smith" is entered into the Employees table with a classification of Unclassified; project name "Stealth Fighter" is entered into the Projects table with a classification of Secret; and assignment name "Programmer" is entered into the Assignments table with a classification of Unclassified. (Because Assignments is a child of Employees and Projects it will also contain columns which point to associated rows in the Employees and Projects table. That is how "John Smith" and "Stealth Fighter" and "Programmer" are all linked together.) A user logged into the database with a Secret or higher security clearance level would be permitted to see that "John Smith" worked on the "Stealth Fighter" project as a "Programmer". A user logged into the same database with an Unclassified security clearance level would (depending upon how the queries were written) be permitted to see that "John Smith" worked on a project as a "Programmer" but couldn't see the name of the project. This could present a security loophole because the Unclassified user has some information about a project they are not permitted to access. (At a minimum, the user can infer that an unknown project exists.) To eliminate this potential security loophole, the "Programmer" record should automatically be labeled at a Secret level although the "Programmer" data is Unclassified. Given this capability, the same Unclassified user could access "John Smith" but not any results related to the assignment as a "Programmer" on any classified project.

What is required is that the "Programmer" record be classified as the "sum" of the "John Smith," "Stealth Fighter," and "Programmer" records. In this example this would be Unclassified+Secret+Unclassified=Secret. Under this approach the "Programmer" record would be protected from the unclassified user and the potential security loophole would be eliminated.

To accomplish this, triggers are written to intercept database insert and update statements and to perform the following steps:
1. Obtain the row label values of all parent rows, if any. (For the "Programmer" record, the Employees parent row label would be Unclassified and the Projects parent row label would be Secret).
2. Determine the overall classification of the data for the row being inserted or updated. ("Programmer" is Unclassified).
3. Sum the parent row labels and the current row's overall data classification. (For the "Programmer" record, it would be the classification of "John Smith" (Unclassified)+the classification of "Stealth Fighter" (Secret)+the classification of "Programmer" (Unclassified)=Secret).
4. Store the calculated row label with the current row's data. (For the "Programmer" record, a row label of Secret would be stored). Note that the row label column (set to Secret) is different from the assignment name classification column (set to Unclassified). The assignment name classification is user entered to specify the classification of an assignment name. In this case, the indication is that the "Programmer" name is Unclassified. The row label column is used to control how that row can be accessed. Although the user entered classification for "Programmer" is Unclassified, due to the "Programmer" record's relationships with other records any database user must be assigned a Secret (or higher) clearance to see it. This is very common. Row label values are always equal to or more restrictive than the user entered classification information within a row of data.

These steps cover half the problem. If a child table is inserted into or updated, the triggers will query the parent tables and calculate the appropriate row label. However, if a parent table is updated with a result that would cause the child table(s) to update, an additional issue must be addressed. For example, if the "Stealth Fighter" record was downgraded from Secret to Confidential the trigger would correctly update the row label value for the "Stealth Fighter" row in the Projects table, but not the "Programmer" row in the Assignments table. That row would still be marked Secret.

While the first half of the trigger software is responsible for calculating a row's label, the other half is responsible for updating any and all immediate child table rows. This portion of the software first checks if the row label of the row being updated has changed during the update. (If the update changed data but didn't effect the row label, there is no need to update the child table). If the row label has changed, the trigger issues a "dummy" update statement on all immediate child tables. The update is called a dummy update because it "updates" a column in a row to its current value. Such an update statement will execute, but since the column is set to the current state there is no net change. This statement is specifically implemented to cause the table's trigger to execute. When the update statement executes, the trigger will execute, and the trigger will obtain the parent table row labels and calculate an appropriate row label for the row being updated. The result is that although the dummy update statement doesn't attempt to change any actual data in the child table, the trigger that executes may cause the row label to update.

In the example, if the "Stealth Fighter" row was updated to Confidential instead of Secret, the Projects trigger would execute and set the row label to Confidential. It would issue an update statement for the "Programmer" row in the Assignments table. (It will set some column to its current value). The Assignments trigger will then execute, obtain the appropriate row labels from the Employees and Projects rows (Unclassified and, now, Confidential), sum those with the "Programmer" data (Unclassified), and set the row label to that result (Confidential). If the Assignments table had a child table, the Assignments trigger would then issue an update to that child table.

So when a table is updated, if necessary the table's trigger causes its immediate child tables to update their row labels. If those child tables have child tables, they will issue update statements on those tables to update their row labels. This cascade continues until child tables which have no child table of their own have been updated. These triggers are identified as "Cascading Row Label Triggers" because a row label change causes a cascade of updates to all descendent tables. The table trigger is efficient since it only acts on the table's immediate child tables—it does not need to traverse all descendents to complete its function. This makes it easier to write and maintain the triggers.

As noted, the above discussion of triggers illustrated the use of triggers in a standard database context. In that context, there are usually separate tables for each object (e.g., Employee table, Projects table, Assignments table, etc.). As noted above, in embodiments of database application framework 10, there is one table for all object types, one table for all objects, etc. Even with this structure, there may be, however, parent-child table relationships. For example, an object table may have a child table that includes the object-property links. This object-property link table may have a child table as well and another parent table (e.g., a property table). Consequently, parent-child processing of triggers 14 may be performed similarly to as described above.

With continuing reference to FIG. 1, database label security application 20, (e.g., OLS) allows a trigger 14 to be executed at one of four points during the processing of a database query manipulation statement (e.g., a SQL insert or update statement):

1. Before Statement Trigger 14: Executes exactly one time before any part of the SQL statement is processed by database 22.

2. Before Each Row Trigger 14: Executes one time for each row being manipulated by the SQL statement, before any change is actually made to database 22.

3. After Each Row Trigger 14: Executes one time for each row being manipulated by the SQL statement, after any change is made to database 22.

4. After Statement Trigger 14: Executes exactly one time after the SQL statement is completely processed.

A Before Each Row Trigger 14 is the only trigger 14 that can alter data that is being inserted or updated in database 22. It is therefore the trigger 14 that queries for parent row labels, calculates an overall row label for the row being inserted or updated, and replaces any row label value being inserted or updated by the SQL statement with that calculated row label.

In the embodiment herein, a Before Each Row Trigger 14 cannot issue update statements to the table's child tables. The After Statement Trigger 14 is therefore utilized. As described above, the Before Each Row Trigger 14 will calculate and set the security label for a row. If the table has child tables, the trigger 14 will also check if the new row label has changed. If the new row label has not changed, the child tables do not need to be updated and the sequence halts. If the row label has changed, the Before Each Row Trigger 14 saves the primary key of the row in a global area that maintains state across multiple trigger executions. When the After Statement Trigger 14 executes, it loops through any and all primary keys (a primary key is one or more columns in a table that uniquely identify a row in a table and that also never change) saved in the global area and issues an update statement on each of the table's child tables which causes the triggers 14 for those rows to execute—hence the cascade. The result is that for each row where the row label has changed, the corresponding child rows will be forced to recalculate their respective row labels.

Figure 9:
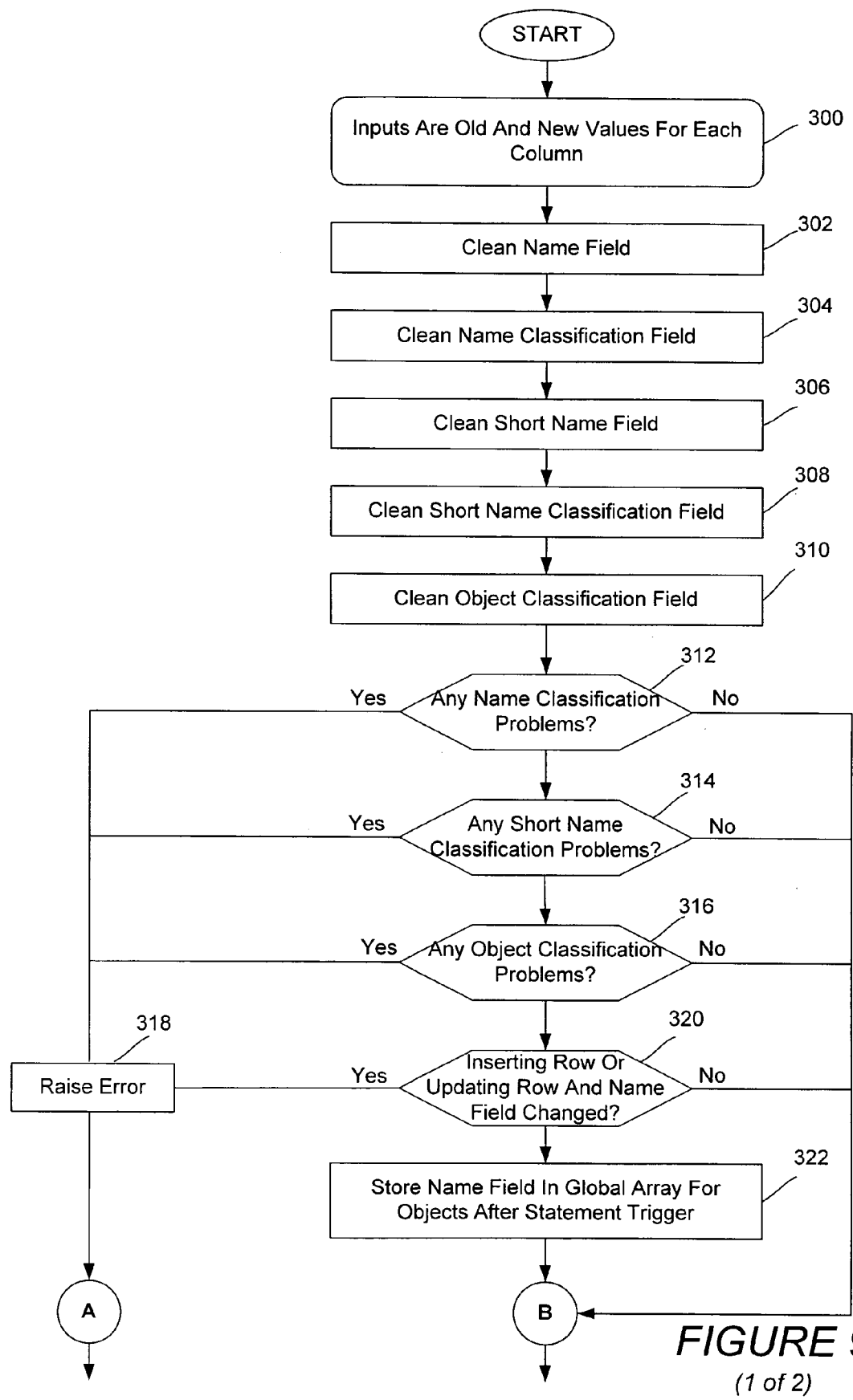
FIG. 9 is a flowchart of an embodiment of a method for processing exemplary triggers in an embodiment of a method for rapid database application deployment and use.
Figure 9:
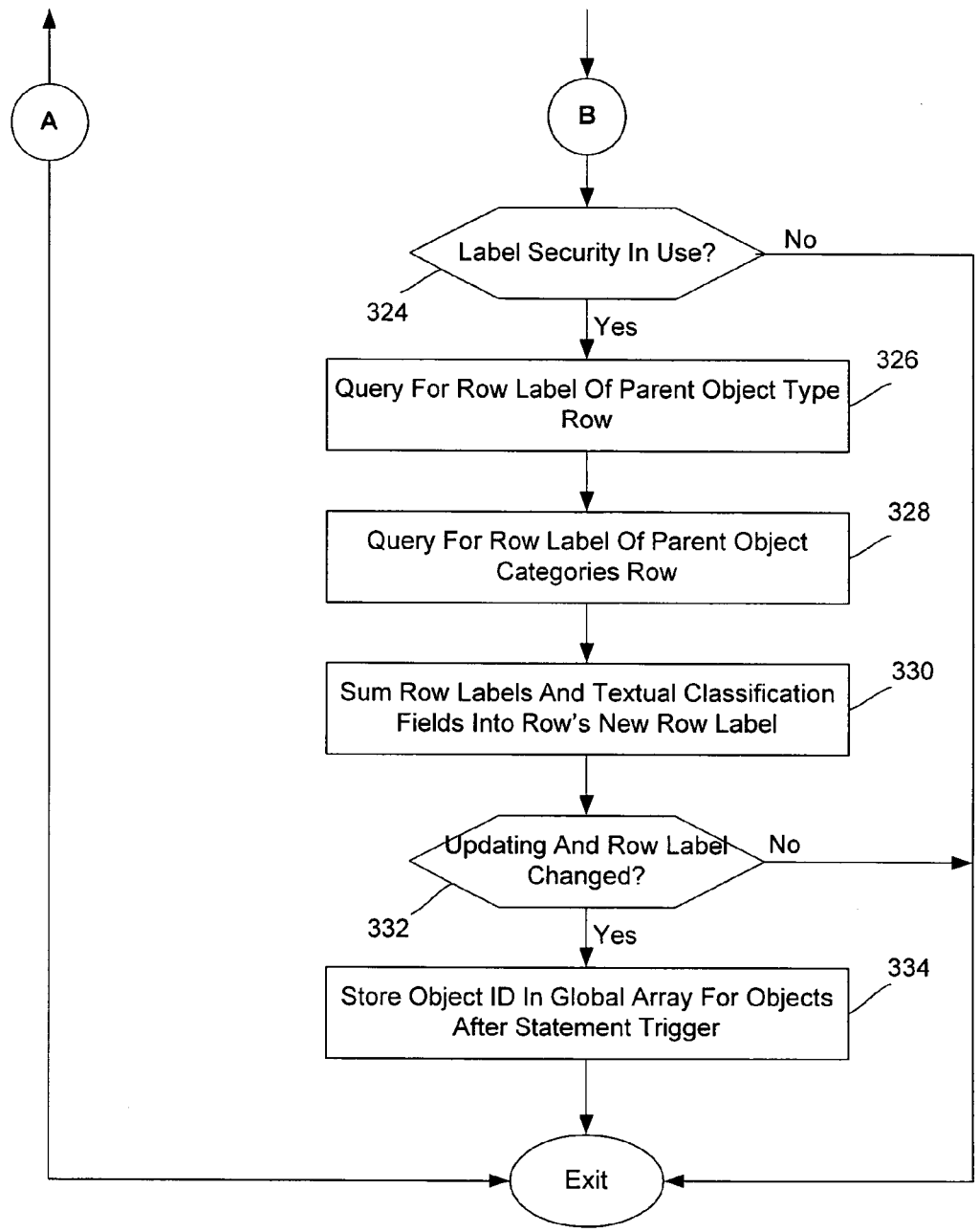
Figure 10:
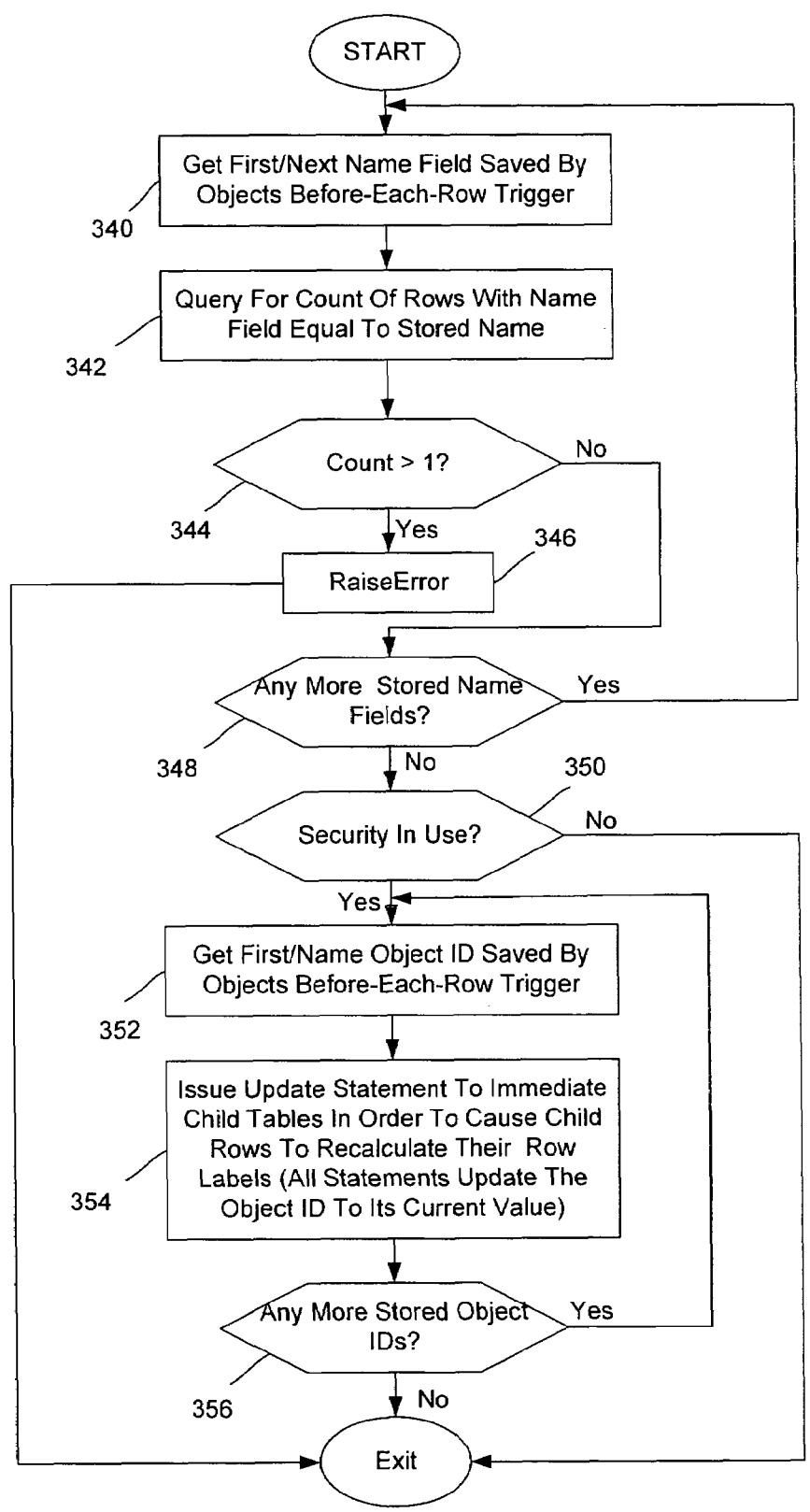
FIG. 10 is a flowchart of an embodiment of a method for processing exemplary triggers in an embodiment of a method for rapid database application deployment and use.

FIG. 9 and the accompanying description below provide an exemplary illustration of the processing of the Before Each Row Trigger 14 for the Objects table. FIG. 10 and the accompanying description below provide an exemplary illustration of the processing of the After Statement Trigger for the Objects table.

Database Search and Visualization

As described previously, system 5 described herein provide a general purpose data viewing capability and a general purpose data editing capability. Most users will probably want a customized searching and reporting capability so that users can create specific searches and generate an output in the format desired. Database application framework 10 is therefore designed to allow new searching and reporting functions to be added in a "plug-in" fashion so that they can be added very simply (without requiring a new release of the application) and so each customer can implement those tailored searches and reports required.

Database application framework 10 does include a general purpose property search capability as well. This search allows a user to pick objects to search and the properties within those objects to search. In the same manner the viewing and editing web pages examine the user defined property structures in order to determine how to present property data, the general purpose search examines the selected properties to determine which input fields to display for the user to enter search data. For example, for a column that contains a number, the user is presented with two pairs of fields, with each pair containing an operator (=, !=, <, <=, >, >=) select list and a text box. With these fields the user can enter searches such as "=10", ">44", or ">27 and <88". The search fields are different for each data type (e.g., number, text, image, date, latitude/longitude, latitude, longitude).

Multiple columns from the same or different properties can be searched. The search can require that all search parameters or any search parameter must match. Metadata (priority, source, comments, timestamp, and user) can also be searched.

For output, the user may choose to either display a list of all objects that match the search criteria or to display the actual property rows that matched.

Database application framework 10 may also include visualization features and functions. The visualization features and functions may display selected objects as icons, displaying lines between objects to show object-to-object associations. Other visualization features may be provided.

Data Migration

Database application framework 10 supports the repeated migration of data from one location to another along a single "thread." For example, assume location Alpha using database application framework 10 has data stored at a maximum classification level of Secret. This data set is copied to a database application framework 10 at location Beta which allows data classifications as high as Top Secret. At location Beta, users enter their own data that expands the original data originating from location Alpha. A user at location Beta may create new individual objects, new properties, or can add additional data to a location Alpha object or property at a higher classification level not permitted at location Alpha.

When location Alpha has an updated data set to be used to update the location Beta data, database application framework 10 migration software replaces all of the data originating from location Alpha with the new data from location Alpha. If any inconsistencies are identified between data sets (for example, location Beta added data about an object created at location Alpha, and that object is now deleted from the new location Alpha data set), the software automatically resolves the problem or alerts the location Beta user that an issue must be resolved before the migration can commence.

There can be many locations (e.g. Alpha, Beta, Charlie) along a single thread. (For example, location Charlie could allow data with classifications up to TS//ABC level (where ABC references a "compartmental" classification.) Although embodiments allow data to be migrated in this manner to systems with increasing security levels, database application framework 10 is not limited to this. Indeed, database application framework 10 allows for the migration of data along a thread of locations regardless of their security classification levels. The data structure and all interface (e.g., web page) software is designed to support this data migration feature.

Classification Verification

Database application framework 10 allows end users to classify the various data items that are entered. All classification information may be verified to insure that proper components are entered. The allowed values in a classification marking are a mixture of built-in values and user defined values.

A user entered classification may be a combination of the following components:
Classification Level (may be built-in to database application framework 10):
  Unclassified
  Confidential
  Secret
  Top Secret
  Compartments (may be user-defined)
Releasability:
  No Foreign (NOFORN) (may be built-in to database application framework 10)
  Originator Controlled (ORCON) (may be built-in to database application framework 10)
  Releasable To (REL TO) (may be built-in to database application framework 10, countries may be user-defined)
  Groups and Group Members (may be user-defined)

Database application framework 10 also computes the overall classification of a web page displaying data from the database 22 based on the sum of the classifications of the data displayed. The overall classification may be optionally displayed at the top and/or bottom of the web page and may include the following information:
  Classification Level
  Compartments
  Releasability
  Groups
  Control Systems, may be determined based on compartments
  Declassification Codes, also may be determined based on compartments Accordingly, embodiments of database application framework 10 provide various security features and may comply with Director of Central Intelligence Directive (DCID 6/3) Protection Level 3/4 (PL 3/4), depending on the implementation. Database application framework 10 may also satisfy the following DCID 6/3 security requirements:
  Classification Banners—These are displayed at the top and bottom of web pages and change according to the security level (e.g., TS), control systems, compartments, and access restrictions (e.g., NOFORN) of the data being viewed or searched.
  Row Labeling—All rows of data in the database require security markings. Database application framework 10, combined with label security, such as OLS, verifies and checks the row labels.
  Security Clearance Verification—Database application framework 10 may verify the user's security clearances (e.g., in conjunction with OLS)—the user will only be permitted to access information they are have clearance for.
  Need-To-Know Restrictions—Database application framework 10 can use a label security (e.g., OLS) group feature or Government-approved software to restrict access to data, based on the individual.

Field Tags

Web page (e.g., HTML) input fields (e.g., text boxes, select lists, checkboxes, etc.) typically are defined using names assigned by the web page developer. For example, if two text boxes on a web page were designed for a user to enter a name and age, the names assigned to these fields may be "name" and "age." If the user entered the name "John" and the age "24" into these boxes, and then submitted the input (e.g. by pressing a submit button or other equivalent), in addition to other information, including the location of the computer and the name of a module or program in user interface software 12 (e.g., a CGI program) to execute, the following text string may be passed from the web browser 16 to the web server 18:
  name=John&age=24

(This method of passing user-entered data is the method defined by the Hyper-Text Transfer Protocol (HTTP), which is the data transmission protocol for the web. The ampersand ("&") character separates multiple name/value pairs. Other methods of passing user-entered data may be used).

A typical CGI program (see further description below) would parse this string to find the name and age values ("John" and "24") entered by the user. Embodiments of database application framework 10 do not need to do such parsing. Embodiments of database application framework 10 may be written using Oracle programming language (e.g., Oracle's Procedure Language/Structured Query Language (PL/SQL)) and utilize Oracle components. Oracle utilizes the web server Apache™. The web server 18 may be a Apache™ web server. An Oracle software module called "modplsql" is added on to the Apache web server to enable it to handle PL/SQL CGI programs. When an Apache web server receives a request to execute a PL/SQL CGI program, the "modplsql" module executes. Among other things, this module parses the data string (e.g., "name=John&age=24") passed from the web browser. The "modplsql" module looks for the specified PL/SQL program and verifies that the program's input parameters match the fields received from the browser. For example, if the PL/SQL program was named "handle_data", the fields passed from the browser may be written as follows:
  procedure handle_data
  (name in varchar2,
  age in number)

This code identifies the "handle_data" program and declares the "name" and "age" input parameters. When the "modplsql" module executes it not only finds the "handle_data" program but it also verifies that the names of the input fields passed from the browser ("name" and "age") match the input parameters of the "handle_data" program. The "modplsql" module also validates that the data types match or are compatible. If "modplsql" cannot find a compatible PL/SQL program, it raises an error. (For example, if the name of the field on the web page was "name" but the input parameter in the PL/SQL program was called "user_name", then there is an error. Likewise, if the user were to enter "xyz" into the age field, "modplsql" would raise an error because it cannot convert "xyz" into a number, which is what the "handle_data" program is expecting for its age parameter. In both cases the error would state that a compatible program could not be found).

The "modplsql" module supports the web browser's capability to pass a data string with multiple name/value pairs using the same name. If, for example, a web page included four text fields allowing a user to enter four names, the web page developer could name all four fields "name." If the user entered "John," "Paul," "Ringo," and "George," the data string passed by the browser may be:

name=John&name=Paul&name=Ringo&name=George

This may also be implemented with select lists that allow a user to pick more than one item from the list. If, for example, a select list (named "ice_cream") of ice cream flavors was placed on a web page and a user picked "Chocolate", "Vanilla", and "Strawberry", the data string may be:

ice_cream=Chocolate&ice_cream=Vanilla&ice_cream=Strawberry

In this case, the "modplsql" module looks for the appropriate PL/SQL program and the program must have an "ice_cream" parameter that is declared as an array. If the program was called "choose_flavors," it may be written similarly to the following:

procedure choose_flavors
    (ice_cream in array of varchar2)

[Note: This is illustrative syntax, but is not necessarily actual syntax].

In this case "modplsql" would parse the data string, place "Chocolate", "Vanilla", and "Strawberry" into an array, and pass the array to the "choose_flavors" program.

The above process works well for normal situations when the input fields on a web page are fixed (i.e. there are a fixed number of fields with defined names) or when there is limited variation (i.e., a variable number of text fields all with the same "name"). However, database application framework 10 includes highly variable input fields on database web pages. Database application framework 10 allows a user to edit multiple properties at the same time on the same web page; each property may have multiple rows; each row may (and almost always does) have multiple cells; each cell may have multiple values; and each value may be made up of multiple parts. In addition, the user may dynamically add input fields to the database web pages for entering new property rows or for adding additional property values (data) into a cell.

Database application framework 10 overcomes these issues by having generic names for web page input fields and including user interface software 12 (e.g., a receiver CGI program) that receives the data from these web page input fields as declared elements of corresponding generic input parameters. This allows receiving user interface software 12 to receive highly variable data. However, by having generic web page input field names, this defeats the CGI program capability to readily determine what property/row/cell/value/part each input field corresponds to from the field name alone. As stated above, a user can edit multiple properties, each property with multiple rows, each row with multiple columns, each column with multiple values, and each value with multiple parts. This could result in the CGI program receiving data elements of hundreds of fields with the same assigned name.

This problem has been solved by database application framework's 10 use of "field tags." In an embodiment, every property data input field on database interface web pages is given the same name of "vda" (for "value data array"). There are a limited number of fields on each web page that are used for purposes other than property data which may be given different names. User interface software 12 (e.g., receiver CGI program) that receives the data includes a declared "vda" input parameter which is an array of character strings. User interface software 12 also declares other parameters to match the names of the other fields. A "hidden" field is included which precedes the property data input fields. A hidden field is another type of input field (e.g., a type of HTML input field) similar to a text field in that user interface software 12 (e.g., creator CGI program) that creates the web page with the input fields can assign an initial value to it and that value will be passed with all the other input fields to the receiving user interface software procedure 12. However, as the name implies, the field is not displayed on the web page. Hidden fields are most often used to pass data from the creating user interface software procedure 12 (e.g., creator CGI program) to the receiving user interface software procedure 12 (e.g., receiver CGI program). As an example, a property data editing web page allows a user to edit data for only one object at a time. The object's ID is stored as a hidden field. When submitted, the object's ID is passed via the hidden field to the receiver CGI program and that program can determine which object is being edited.

In an embodiment, each hidden field tag stores the following information about the displayed input field that follows it:

Value Tag Code: A code (the letter "V") indicating the type of tag. There may be another type of tag used for some of the other, non-property-data input fields on the web page.

Property ID: The ID of the property the data is associated with.

Row ID: The ID of the row within the property.

Row Source: An indicator of whether this row of data has already been stored and retrieved from the database 22 or if the user has chosen to add a new row.

Column ID: The ID of the column within the row.

Value Number: The number of the value within the cell.

Value Source: An indicator of whether the value has already been stored and retrieved from the database 22 or if the user has chosen to add a new value.

Data Type: An ID indicating the data type of the field (number, text, date, etc.)

Part Number: Different data types require different numbers of fields to define a single value. For example, a number value can optionally have a lower and upper range, requiring two input fields. An image requires four fields (title, URL to the image file, pixel width, and pixel height). This part number indicates which part the input field is for.

Visible: Indicates if the input field is visible or hidden. Some fields can be hidden by default if they are usually not populated. The user can choose to make such fields visible and then populate them.

In an embodiment, each of these hidden fields is given the name "vta" (for "value tag array"). When the web page is submitted, the receiver CGI program will receive the data ("vda") and tag ("vta") values. Since each and every property data input field has a corresponding hidden tag field, there will be a one-to-one correspondence between the "vda" and "vta" arrays. For example, the 31st element of a "vta" array will contain all of the information necessary about the 31st element of the "vda" array. Thus the receiver CGI program can now identify and allocate each data element and value received.

Note that not all of the information that is contained within a tag is used by receiver CGI program. In an embodiment, there is a tremendous amount of JavaScript code within the property data editing web page. This JavaScript performs a significant amount of data validation as the user enters data. For example, if a user enters a non-numeric character into an input field that requires a number, the JavaScript will remove the character. If a user forgets to fill out a required field an alert will be raised. Some of the information in a tag is used by both the JavaScript code and by receiver CGI program, while other information is only used by one or the other. For example, the JavaScript code utilizes the visibility information—receiver CGI program does not.

Another set of data/tag fields may be used on the property data editing page for metadata input fields. Metadata is data about the data, such as the originating source of a particular property value. Yet another set of data/tag fields are used on the general purpose search page, where a user can choose which property columns to search through and what to search for. These tags contain different types of data from the property data tags described above, but serve the same purpose. The various pages mentioned herein are further described below.

Other Capabilities and Features:

Embodiments of system 5, including database application framework 10, described herein may include the following additional capabilities and features:

User Defined Text Sections: Users may create object text sections such as "Overview," "Description," "Executive Summary," etc., and any objects can be associated with such sections with text appropriate for the object.

Value Ranges: In addition to storing normal numeric and date values (i.e., "10," "20 Nov. 2005"), embodiments allow the storage of numeric and date ranges (i.e., "10-15," "20 Nov. 2005 to 30 Nov. 2005"). Searches are designed to accommodate normal values and value ranges.

Partial Date/Time Values: A complete date/time field entry includes year, month, day, hour, minute, and second. Partial date/time values allow the user to store a subset of a complete date/time. For example, partial date/times that could be stored include "2005," "Nov-2005," "15 Nov. 2005," and "15-Nov-2005 08:30." Searches may be designed to accommodate full and partial date/time values.

Keywords and Keyword Categories: Objects may be assigned keywords, organized within keyword categories, in order to quickly find objects of interest in the data set.

Property Groups: Rows of property data may be created and placed into a named group. Multiple objects may then share this single "grouped" set of data. If the data in the property group were to change, the change may be immediately reflected in all objects that share it.

Property Value Metadata: The following information may be stored for each property value entered as metadata (e.g., metadata such as priority, source reliability, user comment, timestamp, and user name metadata; other embodiments may include other metadata (e.g., a hard-coded classification list)). When viewing property data, the user may choose to hide the metadata, display it in full, or display icons that can be clicked to display the metadata.

Embedded Sources: Within paragraphs, users may mark a character position within the text and map one or more sources to that position in order to indicate the source(s) of the text. When viewing the paragraphs, the user may choose to hide the sources, display them in full, or display an icon that may be clicked to display the sources.

User Accounts and User Privileges: Editing privileges are given to authorized users only. Each type of editing capability (i.e., editing objects, properties, organizations, classification compartments, etc.) may have its own privilege setting so each user may be assigned only the privileges he needs.

Display Configuration Page: Users may configure the object display page to tailor the data displayed to show the specific information elements (e.g. properties, links, associations, text sections) they wish to see.

Property Definition Search: Users may see the definition of each property, which shows high level property information such as the property name and detailed column information such as column name, data type, data entry format, etc.

User Comments: Any user—not just authorized users—may enter a comment associated to an object. Any user may view such comments. Authorized users may delete or archive user comments but cannot alter them. Alternative security approaches to comments may be used (e.g., limiting viewing and editing of comments based on user privilege level).

Software Processing Methods

Embodiments of system and method for rapid database application deployment and use provide user interfaces to the databases created using the system and method. As discussed above, database application framework 10 provides web page database interfaces. Normal web pages come in two forms: static and dynamic. Static web pages are written by web page developers and are stored in files. HTML editors such as Microsoft FrontPage™ are often used to aid in the creation of a static web page. Every time such a web page is requested by a user the content of the page will be exactly the same; that is, until the web developer changes the file.

A dynamic web page can display different content each time it is displayed. A dynamic web page is written in some type of software language (e.g., Perl, Java, C, C++, Visual Basic, PL/SQL, etc.) that can obtain information from its environment (for example, the operating system, a database, or equipment attached to the system) and adjust the content and/or format of the web page accordingly.

There are two primary methods for delivering dynamic content: server side include (SSI) and common gateway interface (CGI). With SSI, a regular HTML file is created that includes special directives (commands). When a web server returns such an HTML file, it scans it for these directives and executes them. The directives usually obtain data from a database or other part of the operating environment. The advantage here is that most of the web page is written using standard HTML and the directives are generally used only to supply the needed dynamic content.

CGI is a program that creates an entire HTML file dynamically. The CGI program is completely responsible for generating all HTML tags and the content. CGI is the most flexible dynamic web page capability because a CGI program can generate any HTML required, but it is generally more complicated to write than SSI scripts. As discussed above, embodiments, including database application framework 10 illustrated in FIG. 1, are written as CGI. Embodiments of database application framework 10 may be written as CGI in Oracle's proprietary language PL/SQL. As discussed above, user interface software 12 may comprise creator and receiver CGI programs.

Web pages that only display data (and do not allow user data entry) only require one CGI program, a creator CGI program. Web pages that allow data entry usually require two: one program to display the data entry page and another program to receive the user entered data and perform the appropriate actions. As described above a CGI program runs on the server and dynamically creates an HTML file. When the file is completed the CGI program ends, and the web server sends the HTML file to the user's browser. The browser and the web server then terminate communication. If the web page contains data entry fields, user entered data is all saved in the browser until the page is submitted to the receive CGI program. Persistent communication does not exist between the browser and the server as the user enters this data. When the user entered data is "submitted," by pressing a submit or save button all user entered data is sent to the second CGI program. This program must handle the data appropriately, and then generate another web page itself or invoke some other CGI program to generate one.

Although a CGI program creates a web page dynamically, the format of any specific page typically remain static or close to constant. The dynamic aspect of these pages is the data content The information displayed from one rendering of the page to another is expected to change, but the page itself does not. For example, if a web page is displaying data from a database about cars, it may always display a table containing columns for manufacturer, model, year, VIN, license number, and color. In this case, the format (the table and its columns) is constant but the actual values displayed in each cell of the table vary based on the content in the database.

Like most CGI generated web pages, most of the database application framework 10 web pages have a constant format. This means a single page has a constant format—with variable data—from one rendering to the next. (It does not imply that multiple different pages all use the same format.) However, any database application framework 10 web page that displays property data by definition has a variable format. Since properties vary (for example, one property could contain five (5) columns with a certain combination of data types while another could contain fourteen (14) columns with a completely different combination of data types), any web page that displays or provides data entry for properties must be capable of displaying variable formats, in the embodiments described herein. The variable format database interface web pages provided by database application framework 10 provide a novel advantage over existing database development tools in that they allow the database interface to immediately and dynamically reflect changes made by users to the database structure.

Embodiments of database application framework 10 described herein, therefore, may include six types of web pages as described in the following list. Specific web pages may include those described below and illustrated in the '868 provisional, incorporated by reference above. This listing also describes exemplary high level processing that each type of page may employ.

Figure 3:
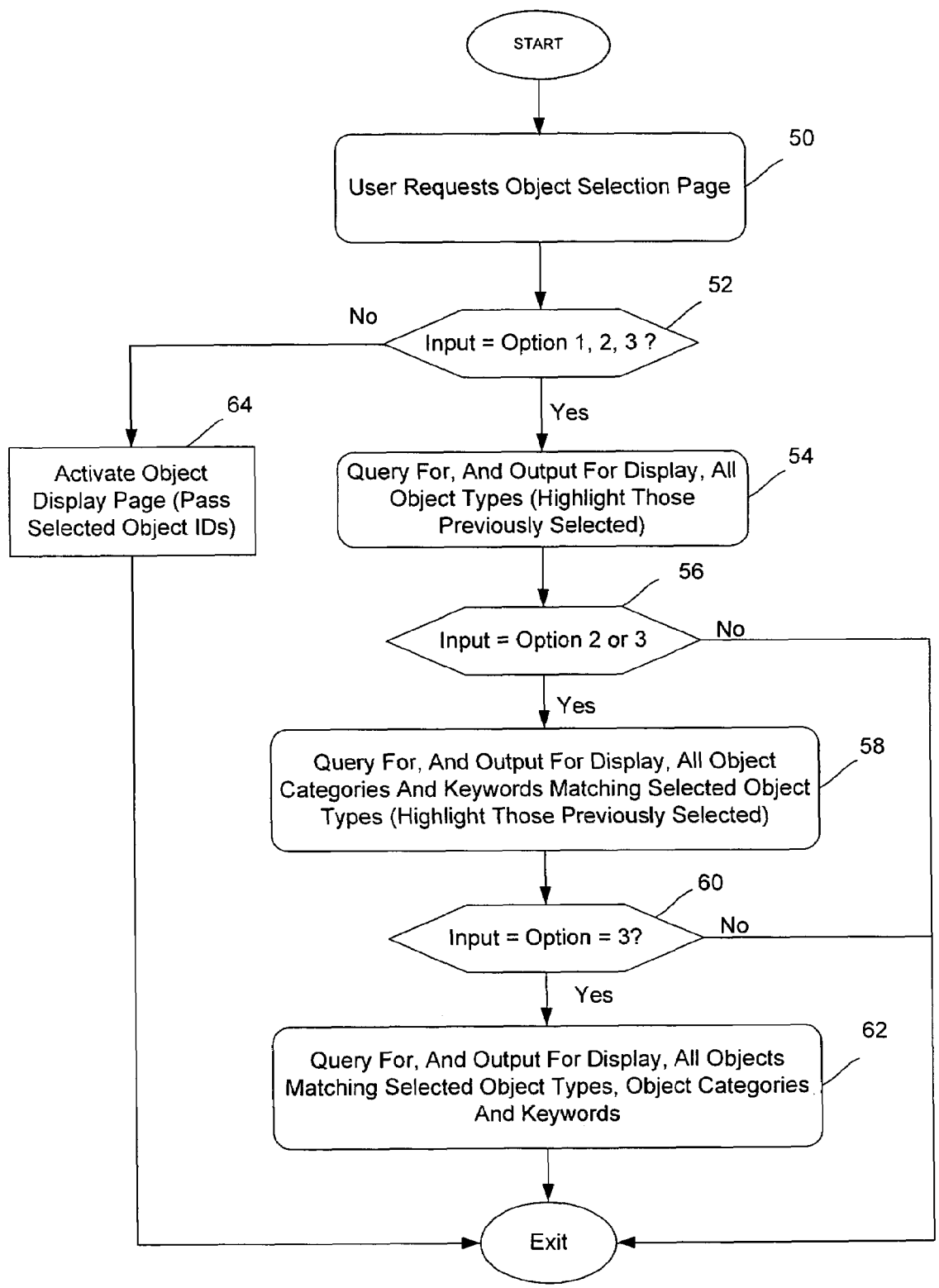
FIG. 3 is a flowchart of an embodiment of a method for processing and displaying an objects selection page in an embodiment of a method for rapid database application deployment and use.

1. Constant format (does not contain properties), display only page. FIG. 3 is a flow diagram illustrating processing for a sample page of this type, an Object Selection web page.

Processing (performed by user interface software procedure 12 (e.g., creator CGI program)):
Query database for all required data; and
Generate constant format HTML file using extracted data.

Figure 4A:
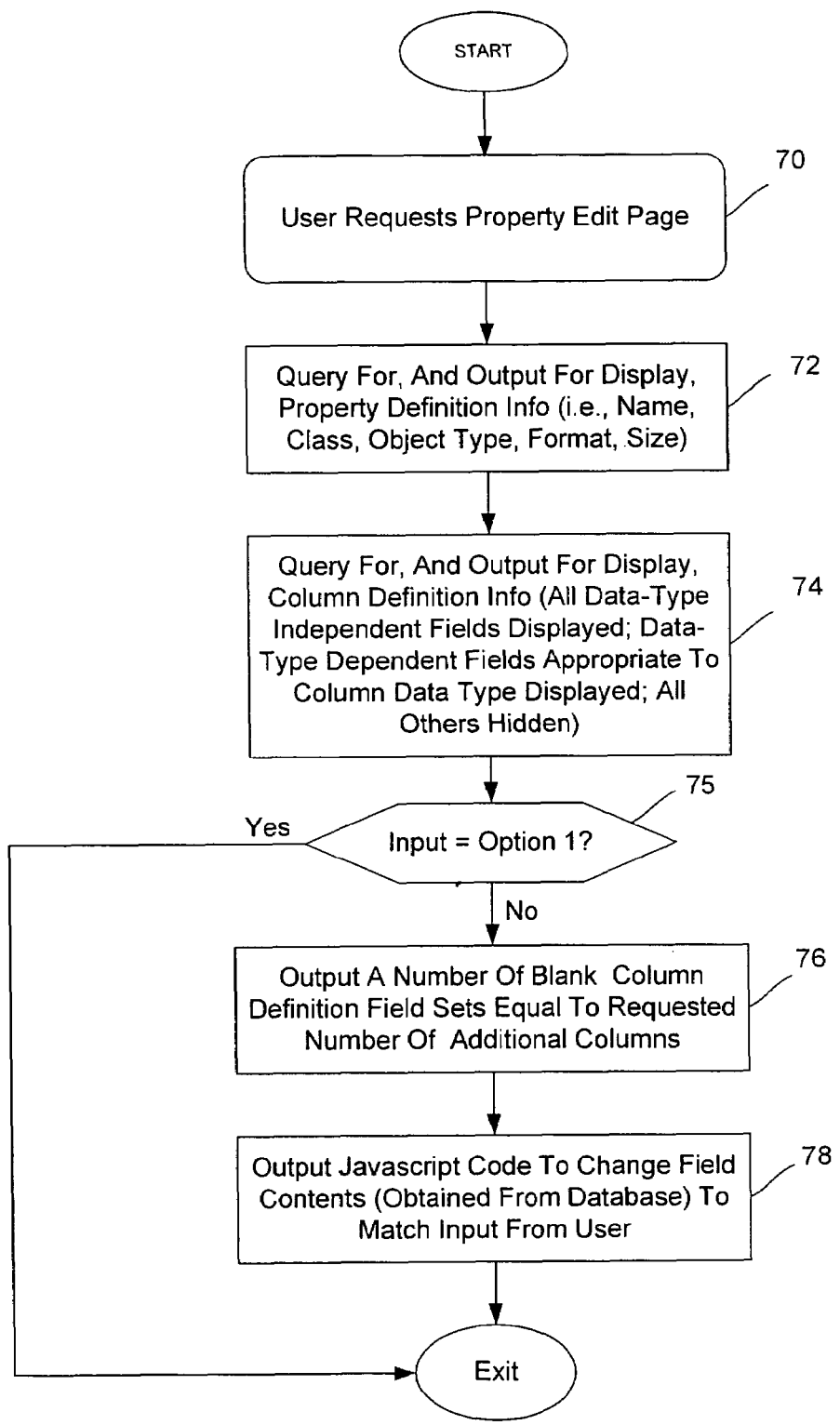
FIGS. 4A-4B are flowcharts of an embodiment of a method for processing and displaying a property edit page in an embodiment of a method for rapid database application deployment and use.
Figure 4B:
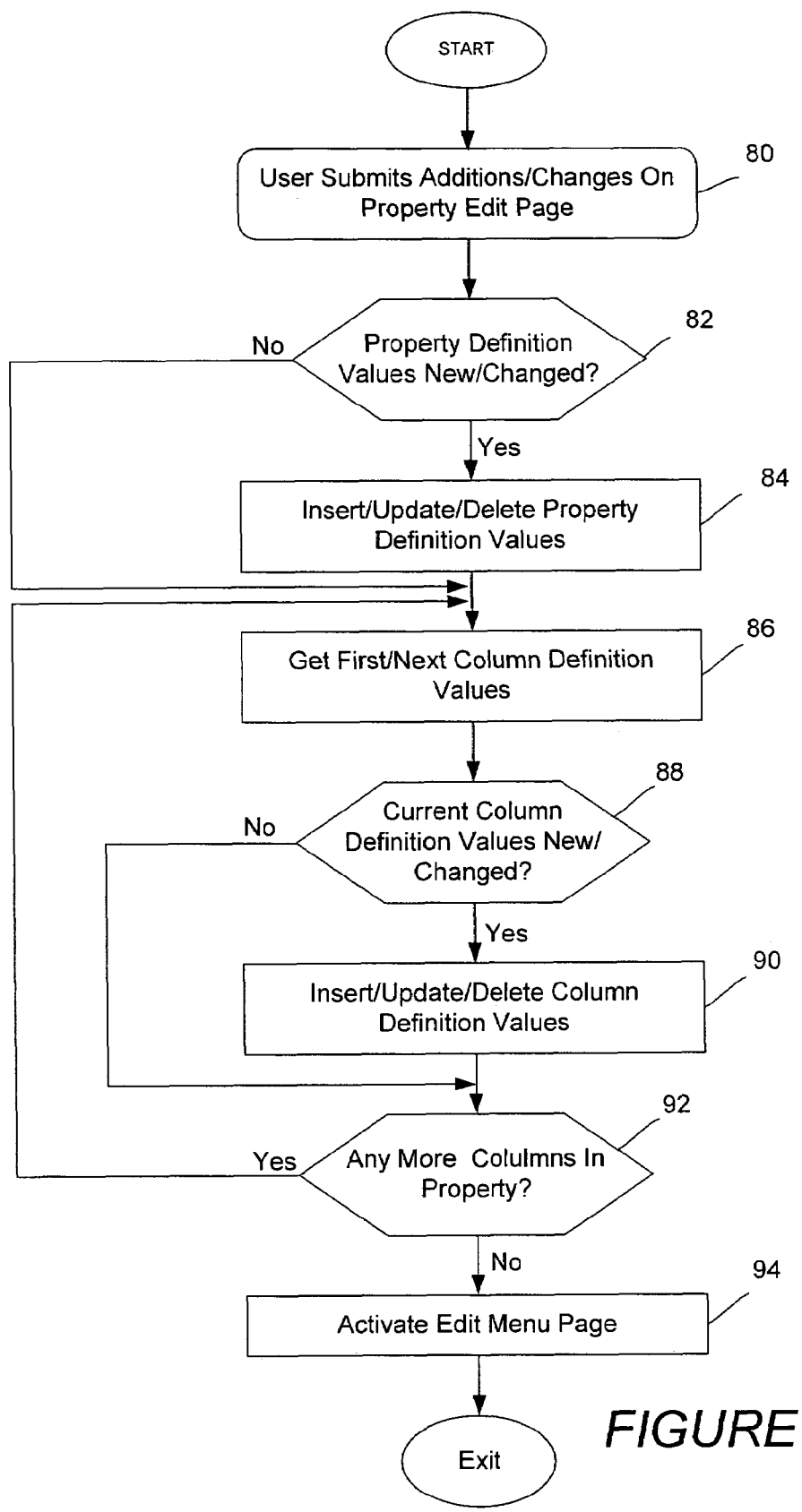

2. Constant format (does not contain properties), data entry page for database update. FIGS. 4A-4B are flow diagrams illustrating processing for a sample page of this type, a Property Edit Page.

Processing:
User interface software procedure 12 (e.g., creator CGI program) 1/2:
Query database for all required data; and
Generate constant format HTML file using extracted data.
User interface software procedure 12 (e.g., receiver CGI program) 2/2:
Receive user entered data;
Insert/update/delete data in database as necessary; and,
Display next web page or invoke another program to display next web page.

Figure 5A:
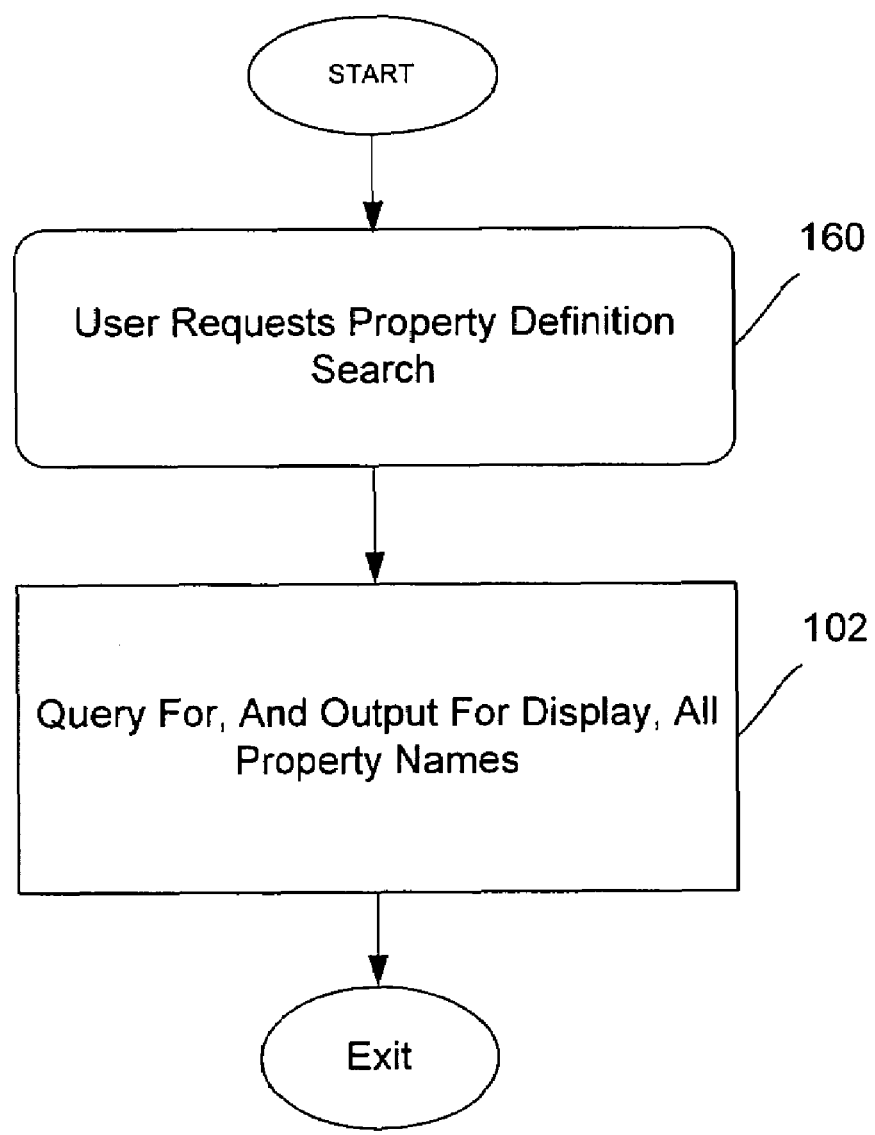
FIGS. 5A-5B are flowcharts of an embodiment of a method for processing and displaying property definition search pages in an embodiment of a method for rapid database application deployment and use.
Figure 5B:
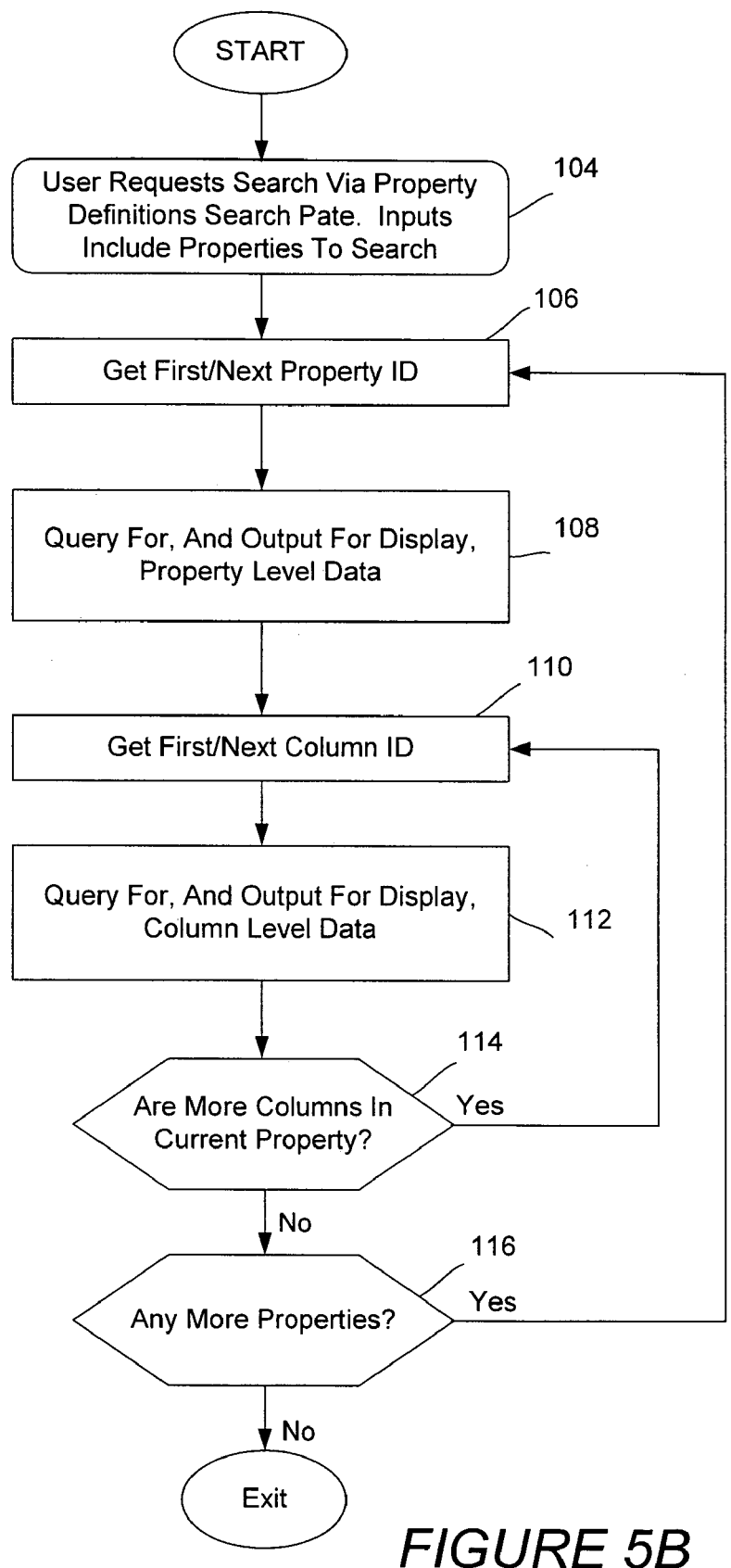

3. Constant format (does not contain properties), data entry page for database search. FIGS. 5A-5B are flow diagrams illustrating processing for a sample page of this type, Property Definition Search Pages.

Processing:
User interface software procedure 12 (e.g., creator CGI program) 1/2:
Query database for all required data; and
Generate constant format HTML file using extracted data.
User interface software procedure 12 (e.g., receiver CGI program) 2/2:
Receive user entered data;
Generate query and execute database search; and,
Display results or invoke another program to display results.

Figure 6:
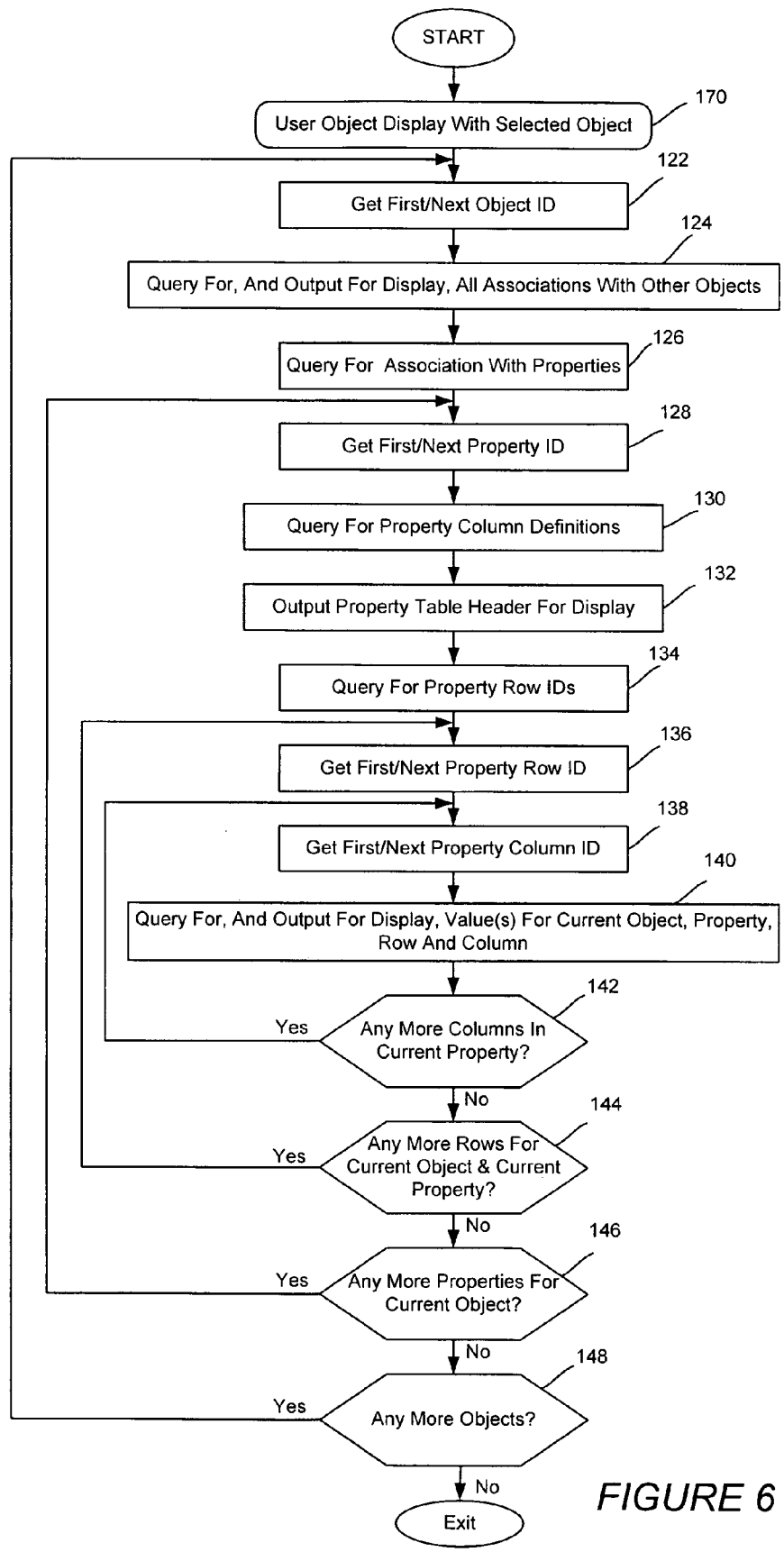
FIG. 6 is a flowchart of an embodiment of a method for processing and displaying an object display page in an embodiment of a method for rapid database application deployment and use.

4. Variable format (contains properties), display only page: FIG. 6 is a flow diagram illustrating processing for a sample page of this type, an Object Display Page.

Processing (performed by user interface software procedure 12 (e.g., creator CGI program)):
Query database for non-property data;
Output appropriate HTML tags and extracted data to display non-property data; and,
For each property displayed:
Query database for property definitions (column names, data types, sizes, etc.);
Query database for property data; and,
Output appropriate HTML tags and extracted data to display property data.

Figure 7A:
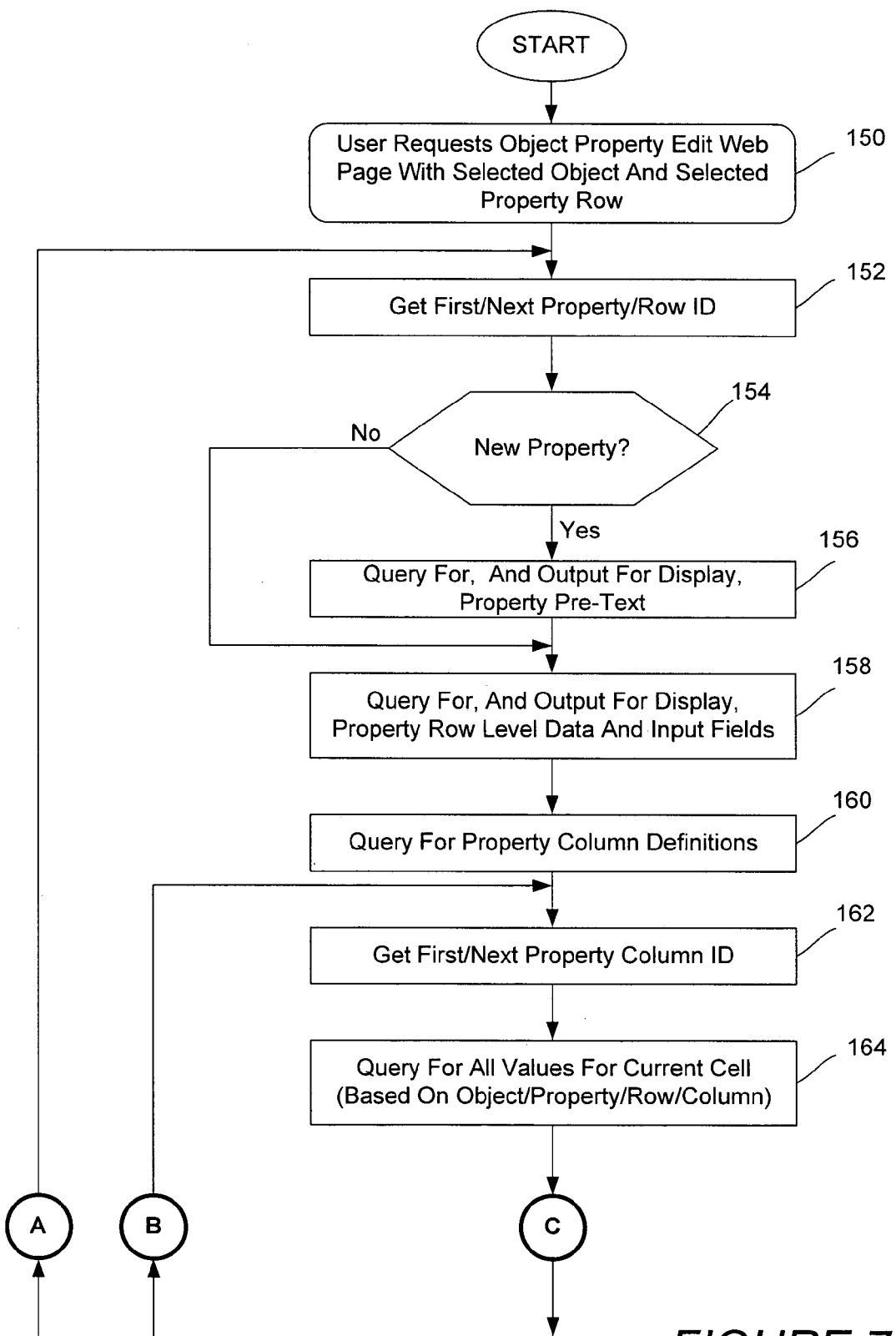
FIGS. 7A-7B are flowcharts of an embodiment of a method for processing and displaying an object property edit page in an embodiment of a method for rapid database application deployment and use.
Figure 7A:
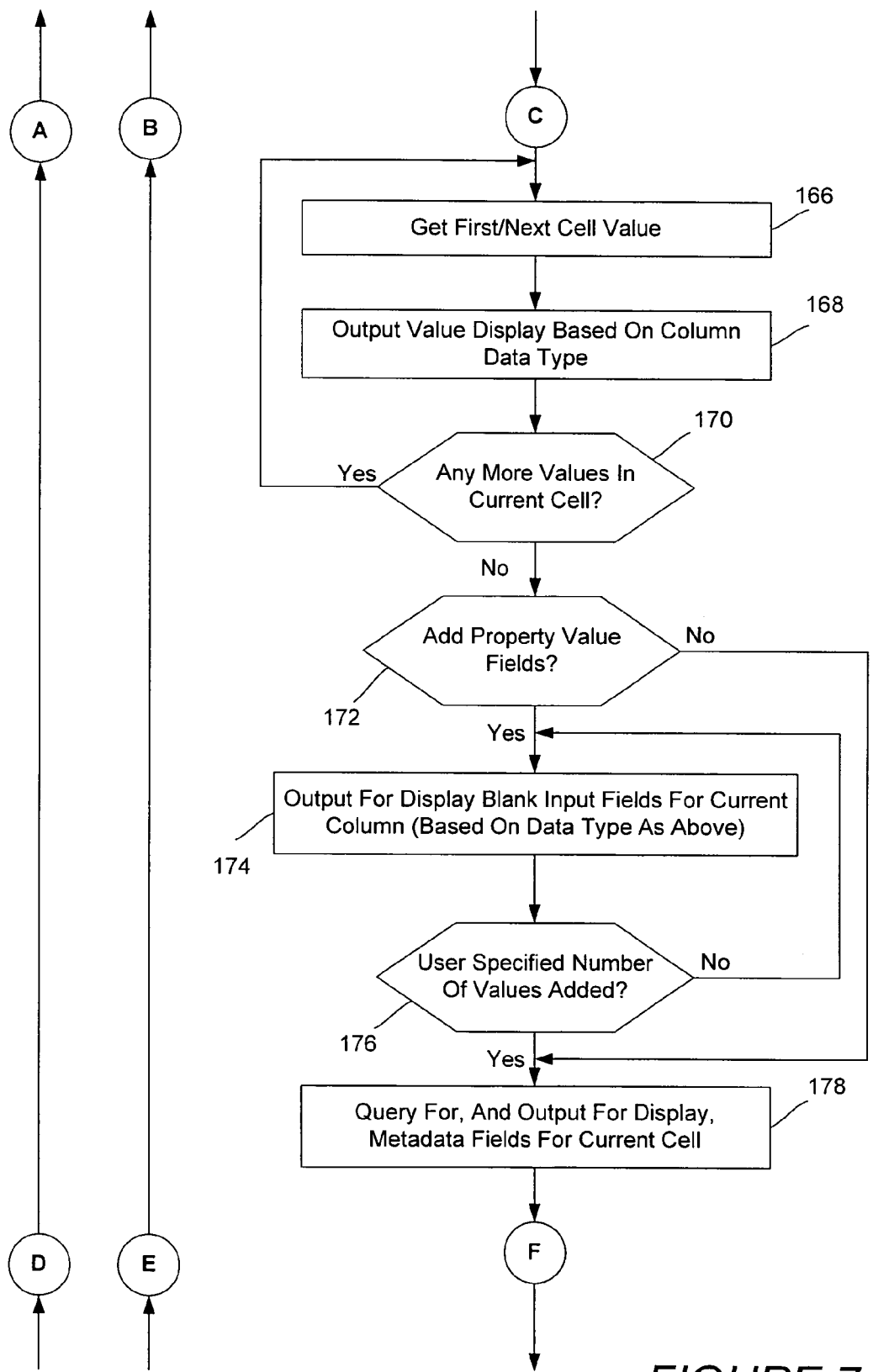
Figure 7A:
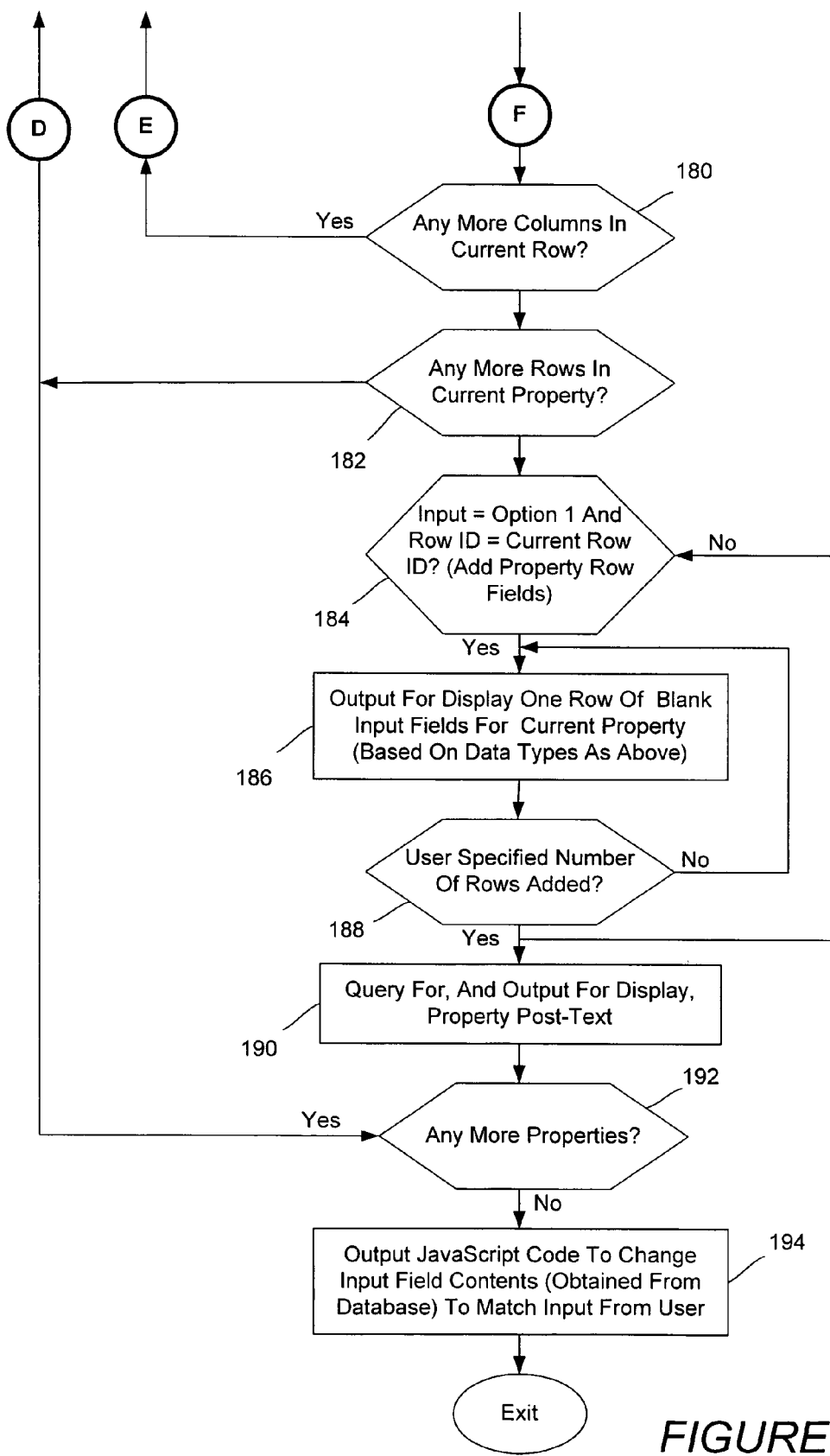
Figure 7B:
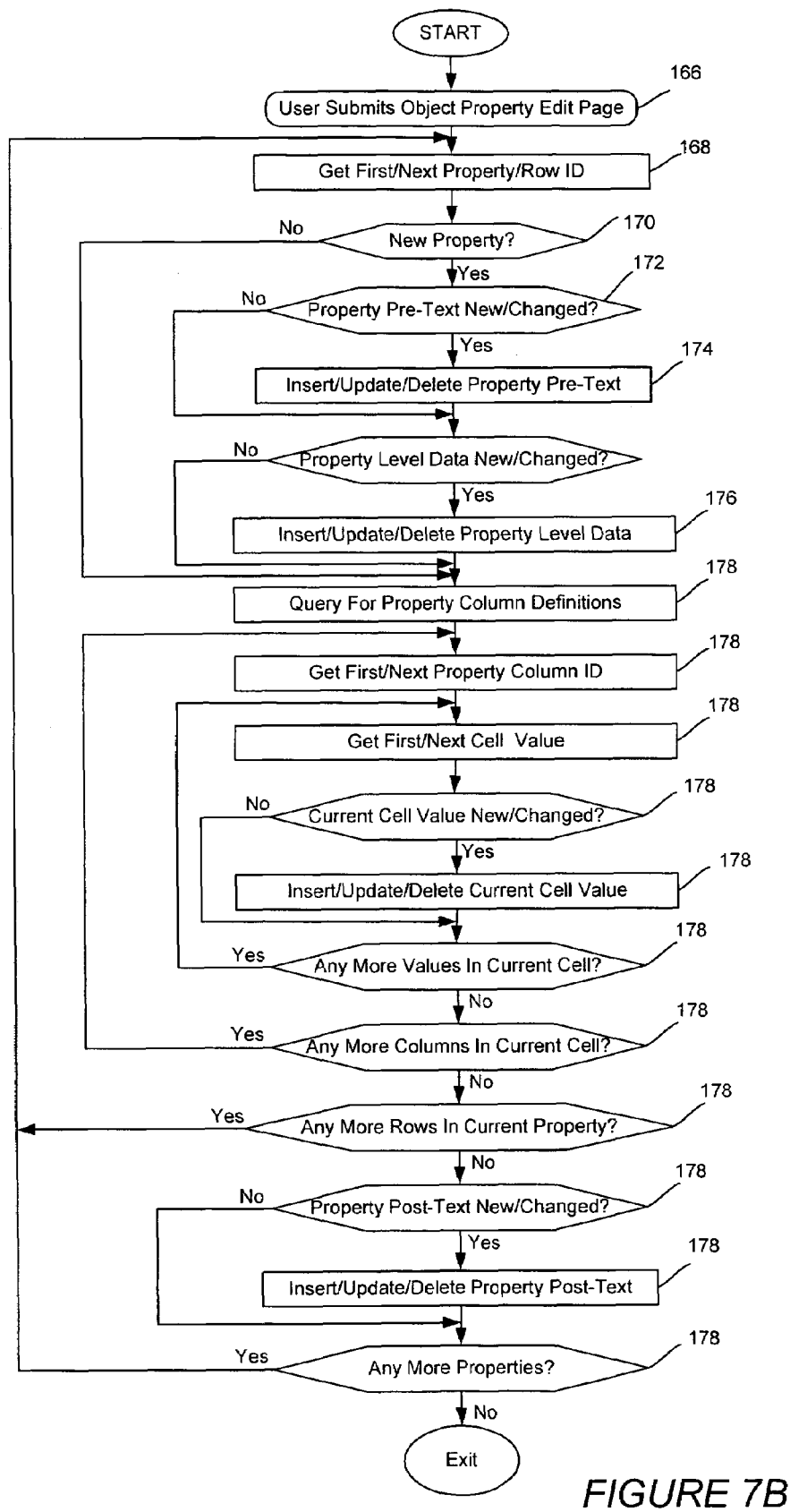

5. Variable format (contains properties), data entry page for database update: FIGS. 7A-7B are a flow diagrams illustrating processing for a sample page of this type, an Object Property Edit Page.

Processing:
User interface software procedure 12 (e.g., creator CGI program) 1/2:
For each property displayed for data entry:
Query database for property definitions (column names, data types, sizes, etc.);
Query database for property data; and,
Output appropriate HTML tags and extracted data to display property data entry fields (includes hidden fields to tag which input fields are associated with which properties and which columns).
User interface software procedure 12 (e.g., receiver CGI program) 2/2:
Receive user entered data;
Use hidden field tags to determine which data values are associated with which properties and columns; and,
For each property displayed for data entry:
Insert/update/delete data in database as necessary; and,
Display next web page or invoke another program to display next web page.

Figure 8A:
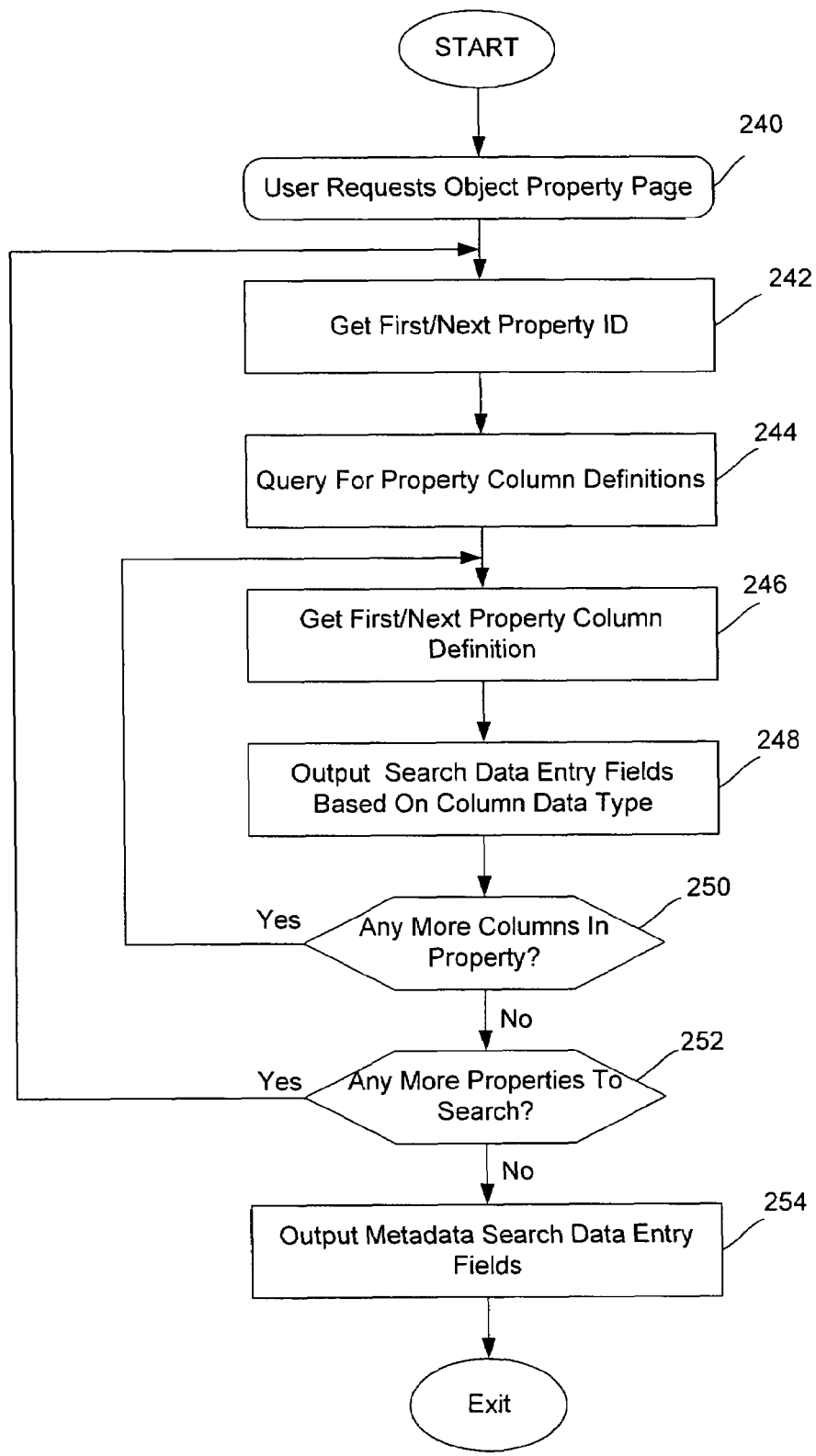
FIGS. 8A-8B are flowcharts of an embodiment of a method for processing and displaying object property search pages in an embodiment of a method for rapid database application deployment and use.
Figure 8B:
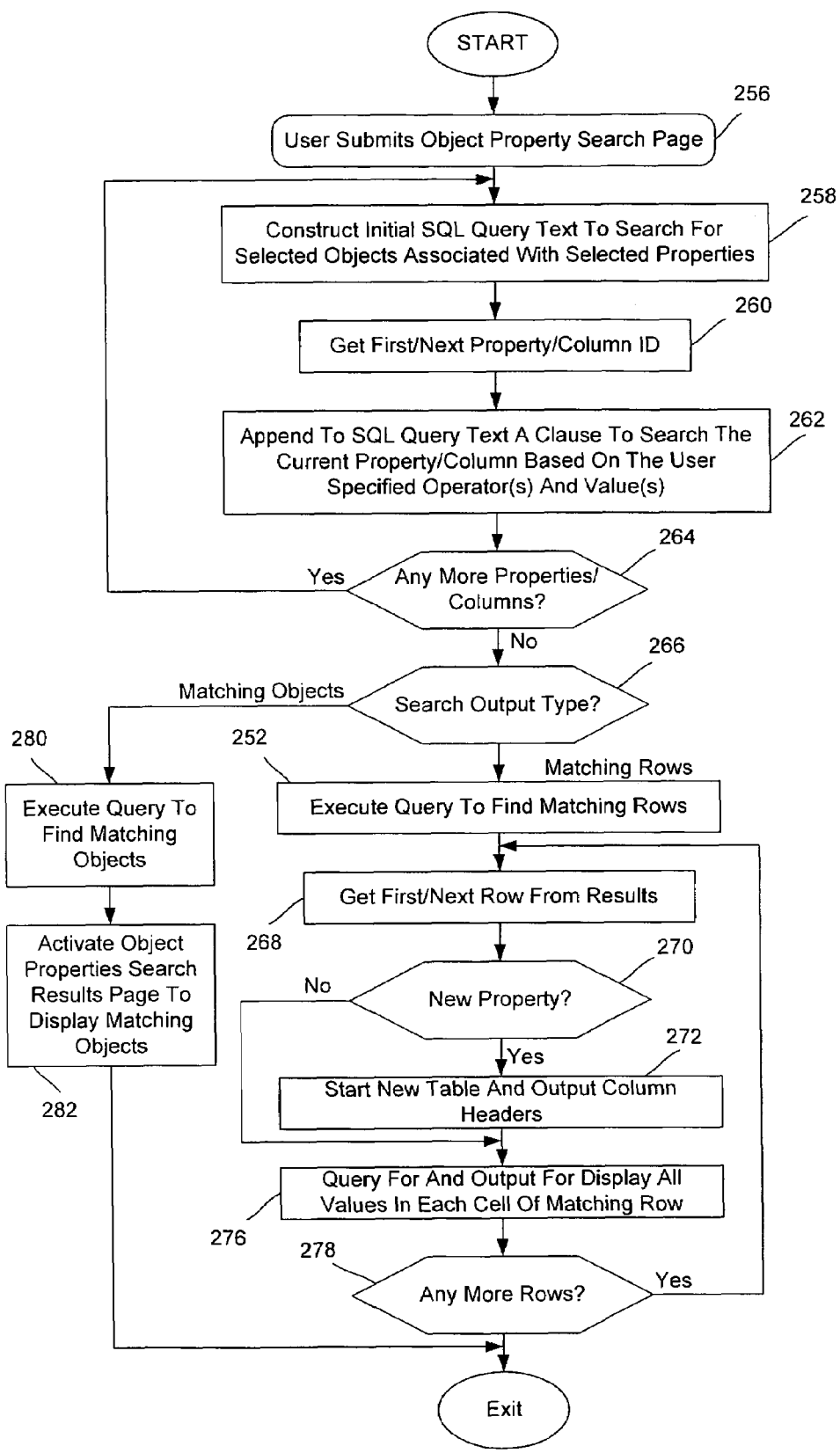

6. Variable format (contains properties), data entry page for database search: FIGS. 8A-8B are flow diagrams illustrating processing for sample pages of this type, Object Property Search Pages.

Processing:
User interface software procedure 12 (e.g., creator CGI program) 1/2:
For each property displayed for data entry:
Query database for property definitions (column names, data types, sizes, etc.); and,
Output appropriate HTML tags to display property data entry fields (includes hidden fields to tag which input fields are associated with which properties and which columns).
User interface software procedure 12 (e.g., receiver CGI program) 2/2:
Receive user entered data;
Use hidden field tags to determine which data values are associated with which properties and columns; and,
For each property displayed for data entry:
Add property info and data to query string;
Execute database search using generated query string; and,
Display results or invoke another program to display results.

With reference now to FIG. 3, shown is a flowchart illustrating processing of a database interface page or screen, the Object Selection web page. The processing illustrated in FIG. 3 may be performed by database application framework 10, e.g., by a user interface software procedure 12 (e.g., a creator CGI program). As mentioned above, the Object Selection web page is an example of a constant format, display only page. Similar processing may be performed for other constant format, display only pages.

The Object Selection web page allows a user to choose items in a variety of filters in order to select one or more objects for display. User interface software 12 (e.g., a receiver CGI program) receives a user request for the Object Selection web page with a variety of inputs, block 50. If it is the initial display (initial condition), there is no accompanying input with the request. In other words, the first time the Object Selection web page is requested (e.g., from a main or home database interface web page generated by database application framework 10 and displayed through web browser 20) there will be no input (option 1). Once the Object Selection web page is displayed, the user may select or change object types, object categories/keywords, or objects (options 2-4). When the Object Selection web page is first displayed only the select list of object types is included on the page. When a user selects one or more object types and clicks, e.g., a Go button, the page re-displays but now includes the object types select list (with the items the user just selected still selected) plus an object categories select list and a keywords select list. The page will jump down to the object categories and keywords select lists (which causes the object types select list to scroll off the top of the page). It is expected at this point that the user will select object categories and/or keywords and then press the Go button to generate a list of objects, but he instead could scroll the page up, select different items from the object types select list, and press, e.g., a Change button. This would cause the page to re-display again with the object types select list at the top and the object categories and keywords select lists at the bottom, but the content of the object categories and keywords select lists will be different because their content is based on the selected object types. Similarly, if a user selected object types and clicked Go, then selected object categories and/or keywords and clicked Go, the page would redisplay with the same object types, object categories, and keywords select lists followed by a select list of matching objects at the bottom. At this point a user could select different object types and click Change, select different object categories and/or keywords and click Change, or select objects and click Go. If the object types Change button is clicked, the page redisplays with new object categories and keywords select lists. If the object categories/keywords Change button is clicked, the page redisplays with a new objects select list (that matches the object types, object categories, and keywords selected). If the objects Go button is clicked, the selected objects are displayed.

As the user makes selections on the Object Selection web page, the creator CGI program will be executed, receiving those selections as inputs and each time displaying the Object Selection web page (or other web pages—see below) with new or changed information corresponding to those selections. In this manner, the user may 'drill-down' into the available objects by type, category, and/or keyword, before selecting specific objects for display. In other words, options 2-4 are information the user may select and/or change to cause the Object Selection web page to redisplay.

The processing may determine what input is present (e.g., if initial display, if object types, categories and/or keywords were selected/changed, or if objects were selected), block 52. If initial display, the processing queries for and displays on the Object Selection web page all object types, highlighting those previously selected, block 54, and then the processing may end. The processing may determine whether object types, categories, and/or keywords are selected/changed, block 56. If the user selected/changed object types (option 2), the processing executes blocks 54-56 and queries for and displays on the Object Selection web page a select list of object categories and a select list of keywords that correspond to those selected object types, highlighting those previously selected, block 58, and then the processing may end. The processing may determine whether object categories and/or keywords were selected/changed, block 60. If the user selected/changed object categories or keywords (option 3), the processing executes blocks 54-60 and queries for and displays on the Object Selection web page a select list of objects that correspond to those selected object types, object categories, and object keywords, block 62, and then the processing may end. If the user selected objects (option 4), the processing invokes the program to display those objects, activating an Object Display page, passing the selecting object ids, and displaying the selected objects on the Object Display page, block 64, and then the processing may end. With reference now to FIGS. 4A-4B, shown are flowcharts illustrating processing of another database interface page or screen, the Property Edit web page. The processing illustrated in FIGS. 4A-4B may be performed by database application framework 10, e.g., by user interface software 12 (e.g., a creator CGI program and a receiver CGI program, respectively). As mentioned above, the Property Edit web page for database update is an example of a constant format, data entry page. Similar processing may be performed for other constant format, data entry pages.

The Property Edit web page allows a user to define a new property. In an embodiment, two user interface software 12 modules or programs are used in combination—a creator procedure to display the web page (e.g., a creator CGI program) and receiver procedure to take the user entered data and update the database (e.g., a receiver CGI program).

With reference now to FIG. 4A, shown is exemplary processing performed by creator user interface software 12 (e.g., the creator CGI program). A user request or selection of the Property Edit web page is received with various inputs, block 70. For example, the first time the Property Edit web page is requested (e.g., from a main or home database interface or Edit Menu web page generated by database application framework 10 and displayed through web browser 20) there will be no input (option 1). If and when the user wishes to add new blank column input fields for defining a new property column, the user requests a number of new blank column input fields, which is received by the creator CGI program as an input and the creator CGI program re-executes, causing the page to update with the appropriate fields (option 2). The input will include current property definition information from previously generated Property Edit web page plus user additions/changes and a count of columns to add.

Regardless of the input, the processing queries for and displays property definition information (i.e., name, class, object types, format, size), block 72. This step obtains all high level (non-column) property information for the property being edited from the database 22 and displays appropriate input fields on the Property Edit web page. Likewise, the processing queries for and displays column definition information, displaying all data-type independent input fields and data-type dependent input fields appropriate to column data and hiding all others, block 74. There are pieces of information about a property column that are independent of the data type of the column. For example, a column's name, whether or not it is required, whether or not a timestamp is to be stored if the data in the column is updated, etc. The input fields for these pieces of information are always shown because they always apply. There are other pieces of information that are data dependent. For example, for a column that is a number data type, there are input fields where the user can enter the minimum and maximum allowed values. These particular input fields would not apply to other data types such as a text data type. So what happens is all data dependent input fields are included in the HTML file but they are hidden by default, which means they don't show up on the page. When the user chooses the data type for a column (via a select list), the data type dependent input fields for that data type are changed from hidden to visible (e.g., via JavaScript within the HTML—this does not require a re-execution of the PL/SQL software at the server) and the input fields immediately appear. So this means a user could choose to make a column a number (which would cause all number-specific input fields to be displayed) and then change it to text (which would cause all number-specific input fields to go back to hidden and all text-specific input fields to be displayed). So the document is saying the software includes all input fields within the HTML but sets them to visible or hidden as appropriate. Block 74 obtains all property column information for the property being edited from the database and displays appropriate input fields on the Property Edit web page.

With continued reference to FIG. 4A, the processing may determine what input was present (e.g., initial display or condition (option 1) or re-display after user requests to make additions/changes (option 2)), block 75. If the initial displaying of the page, the processing ends. Otherwise, the user has requested additional blank column input fields to be added to the Property Edit web page in order to add information for one or more new columns for the property. In that case, the processing outputs sets of blank column input fields corresponding to the number of new columns requested by the user, block 76. If the Property Edit page were to display as is after receiving the user request for new blank column input fields, the fields would be re-populated with the data obtained from the database and any changes the user made before requesting the additional blank column input fields would be lost. Therefore, the processing also generates and outputs code (e.g., JavaScript code) to change field contents to match input from the user, block 78. This step ensures that after the Property Edit web page loads any and all fields that the user had changed will be immediately updated so that the Property Edit web page shows all of the last values entered by the user. By first displaying the data from the database 22 and then updating to the last values entered by the user, the user can still use reset buttons on the Property Edit web page to reset fields to their initial states. If the input fields were initially populated with the last entered values, this reset would not work. Processing ends but may be repeated if the Property Edit web page is re-selected or if additional user requests to add blank column information input fields are received. When the user enters data and submits the Property Edit web page, the processing shown in FIG. 4B occurs.

With reference now to FIG. 4B, exemplary database 22 update portion of the processing of the Property Edit web page is shown. The processing shown here may be performed by a receiver CGI program. The processing receives the user entered data from the Property Edit web page, block 80. This input includes "high level" data about the property (such as its name) as well as information about each column. The processing determines if any of the high level property data (property definition values) have been changed or new data added, block 82. This is done by querying the database 22 and comparing those results against the user entered high level data. If any changes have been made, all of the high level data is inserted, updated, and/or deleted in the database 22 as appropriate, block 84. If no changes have been made, this step is skipped. The information for the first property column on the Property Edit web page is obtained from the user entered data, block 86. The processing determines if any of the column data (column definition values) has been changed or is new, block 88. This is done by querying the database 22 and comparing those results against the user entered column data. If any changes have been made, all of the column data is inserted, updated, and/or deleted as appropriate, block 90. If no changes have been made, processing skips this step. The processing determines if there is any more user entered column data to process (i.e., are there any more columns in property), block 92. If so, processing returns to block 86 where information for the next property column is obtained. If not, the processing may end of an Edit Menu web page is activated and displayed, block 94. The Edit Menu web page allows a user to edit another property or to choose some other editing page.

With reference now to FIGS. 5A-5B, shown are flowcharts illustrating processing of other database interface pages or screens, the Property Definition Search web pages. The processing illustrated in FIGS. 5A-5B may be performed by database application framework 10, e.g., by user interface software 12 (e.g., a creator CGI program and a receiver CGI program, respectively). As mentioned above, the Property Definitions Search web pages are an example of a constant format, data entry page for database search. Similar processing may be performed for other constant format, data entry pages for database search.

The Property Definition Search web pages allow a user to select one or more properties and to view the definitions of those properties. This includes information about the property as a whole (like the name and format) and information about each column within the property.

With reference now to FIG. 5A, a user request for a property definition search is received, block 100. This request may be made, e.g., on a Property Definition Search web page or other main search page, and received and processed by, e.g., a creator CGI program. A database query to select and display the names of all properties is performed, block 102. This step may include outputting appropriate HTML code to create and display a select list of property names on a Properties Selection web page. The processing for displaying properties for selection for the search then ends. When the user enters data and submits the Properties Selection web page with the selected property(ies), processing will continue in FIG. 5B With reference now to FIG. 5B, processing for generating and displaying a Search Results web page is shown. User input of properties selected by the user for searching is received, block 104. The user input may be received by, e.g., a receiver CGI program, and may include property ids entered by the user or corresponding to displayed properties selected by the user. The id for the first selected property is obtained from the user entered data, block 106. A database query is performed to select and display high level information about a property, block 108. This property level data includes the property name, classification, associated object types, description, format, and size. Appropriate HTML code may be output to display this information on the Results web page.

The id for the first column within the property currently being processed is obtained from the database 22, block 110. A database query is performed to select and display all information about the column, block 112. This column level data includes the column name, position, data type, data entry requirements, and metadata settings. Appropriate HTML code may be output to display this information on the Results web page. The processing may determine if there are any more columns within the current property, block 114. If so, processing returns to block 110 where information for the next property column is obtained. If not, the processing may determine if there are any more properties within the user entered data, block 116. If so, processing returns to block 106 where information for the next property is obtained. If not, processing may end.

With reference now to FIG. 6, shown is a flowchart illustrating processing of another database interface page or screen, the Object Display web page. The processing illustrated in FIG. 6 may be performed by database application framework 10, e.g., by user interface software 12 (e.g., a creator CGI program). As mentioned above, the Object Display web page is an example of a variable format, display only web page. Similar processing may be performed for other variable format, display only web pages. The Object Display web page displays all information about one or more selected objects. This primarily includes property data and associations with other objects. User interface software 12 (e.g., a creator CGI program) for the Object Display web page receives one or more selected objects passed from one of several web pages (e.g., Object Selection web page (see FIG. 3)), block 120. The selected objects may be selected by a user on another web page. The id for as first selected object may be obtained from the passed input, block 122. A database query is performed to select and display all information about the current object's associations with other objects, block 124. The association information includes the names of the objects, their types, and the types of associations. Appropriate HTML code may be output to display this information. With continued reference to FIG. 6, a database query is performed to return a list of all properties associated with the current object, block 126. A first property id returned from the query is obtained, block 128. A database query is performed to return all column definition data for the current property, block 130. A table header row containing the names of the columns obtained from the query in block 130 is output and displayed, block 132. HTML code may be output to create the table header row.

A database query is performed to return a list of all rows within the current property and associated with the current object, block 134. A first row id returned from the query is obtained, block 136. A first column id returned from the query in block 130 is obtained, block 138. A database query is performed to select and display all values associated with the current object (obtained in block 122), property (obtained in block 128), row (obtained in block 136), and column (obtained in block 138), block 140. HTML code may be output to create an HTML table cell containing the values.

With continued reference to FIG. 6, processing may determine if there are any more columns within the current property, block 142. If so, processing returns to block 138 where information for the next column is obtained. If not, processing may determine if there are any more rows within the current object and current property, block 144. If so, processing returns to block 136 where information for the next row is obtained. If not, processing may determine if there are any more properties within the current object, block 146. If so, processing returns to block 128 where information for the next property is obtained. If not, processing may determine if there are any more objects within the list of objects passed in block 120, block 148. If so, processing returns to block 122 where information for the next object is obtained. If not, processing may end. With reference now to FIGS. 7A-7B, shown are flowcharts illustrating processing of another database interface page or screen, the Object Property Edit web page. The processing illustrated in FIGS. 7A-7B may be performed by database application framework 10, e.g., by user interface software 12 (e.g., a creator CGI program and a receiver CGI program, respectively). As mentioned above, the Object Property Edit web page is an example of a variable format, data entry page for database update. Similar processing may be performed for other variable format, data entry pages for database update.

The Object Property Edit web page allows a user to enter property data for a single object. Two user interface software 12 modules or programs may be used in combination—one to display the web page (e.g., a creator CGI program) and another to take the user entered data and update the database (e.g., a receiver CGI program).

With reference now to FIG. 7A, shown is a flowchart illustrating the display processing of the Object Property Edit web page. A user request for the Object Property Edit web page is received, block 150. The request is received with a selected object and selected property/row information indicating the object selected for edit and the property rows selected for edit. If the Object Property Edit web page has already been displayed and a user request to add more rows to a property or add more values to a property row cell is received, the display processing may be executed again (e.g., the creator CGI program may be executed again) and the following additional input is passed: all data within the displayed input fields. Initially this data is the data extracted from the database 22 and placed on the Object Property Edit web page by the creator program. If the user has modified any data, that user entered data will be passed; if the user has requested additional property rows, the id of the property to add to and a count of the number of rows to add is passed; and, if the user has requested additional cell values, the ids of the property, row, and column to add to and a count of the number of values to add is passed.

A first property/row id is obtained from the passed input, block 152. The processing may determine if the identified row is for a new/different property than the last row processed, block 154. If the row is for a new/different property, a database query is performed to select and display property pre-text, block 156. Property pre-text is text that is to be displayed before the property data when an object is viewed. Appropriate HTML code may be output to display this information. If the row is for the same property as the last row, processing skips this step.

With continued reference to FIG. 7A, a database query is performed to select and display property row level data on the Object Property Edit web page, block 158. The property row level data includes the classification of the row and the source organization of the row's data (if any). Appropriate HTML code may be output to display this information. A database query is performed to select all property column definitions for the current property, block 160. A first column id returned from the query is obtained, block 162. A database query is performed to select all values for the current cell, block 164. The query is based on the object, property, row, and column being processed. The first value returned from the query is obtained, block 166. Input fields are displayed on the Object Property Edit web page for the user to input the property data. HTML code may be output to display the input fields. The fields displayed are based on the data type of the property column and may be as follows (data type followed b$_y$: fields displayed):

Number: Text or select list input fields for lower and upper numeric entry.

Text: Text or select list input field for text entry.

Image: Text input fields for image title, URL, pixel height, and pixel width entry.

Date: Text and select list input fields for year, month, day, hour, minute, and second entry.

Latitude/Longitude: Text input fields for latitude and longitude entry.

Latitude: Text input field for latitude entry.

Longitude: Text input field for longitude entry.

Processing may determine if there are any more values within the current cell, block 170. If so, processing returns to block 166 where information for the next value is obtained. If not, processing may determine if the user has requested additional empty input fields for adding additional values for the current cell being processed, block 172. If the user requested additional empty input fields, blank input fields for the current column, based on the data type of the column (same as those output in block 166), are displayed on the Object Property Edit web page, block 174. HTML code may be output to display one set of empty input fields in order to allow entry for one additional value. Processing may determine if the number of additional sets of input fields output so far is equal to the number requested by the user, block 176. If not, processing returns to block 174 to output and display additional empty input fields. If the user did not request additional empty input fields, these steps are skipped.

With continued reference to FIG. 7A, a database query is performed to select and display user enterable metadata for the current cell being processed, block 178. This may include priority, source reliability, and user comments. HTML code may be output to display these fields. Processing may determine if there are any more columns in the current property being processed, block 180. If so, processing returns to block 162 where information for the next column is obtained. Otherwise, processing may determine if there are any more rows in the current property being processed, block 182. If so, processing returns to block 152 where information for the next row is obtained. Otherwise, processing may determine if the user has requested additional empty input fields for adding additional rows for the current property being processed, block 184.

If the user has requested additional empty input fields for additional rows for the current property, processing may display one row or set of blank input fields for the current property one the Object Property Edit web page, block 186. The fields output are dependent upon the data types of the columns and are the same as those output in block 168. HTML code may be output to display the one set of empty input fields in order to allow entry for one additional property row. Processing may determine if the number of additional sets of input fields output so far is equal to the number requested by the user, block 188. If not, processing returns to block 186 to output additional empty input fields. If the user has not requested additional empty input fields, these steps are skipped as shown.

A database query is performed to select and display the property post-text on the Object Property Edit web page, block 190. The property post-text is text that is to be displayed after the property data when an object is viewed. Appropriate HTML code may be output to display this information. Processing may determine if there are any more properties to process, block 192. If so, processing returns to block 152 where information for the next row is obtained. Otherwise, if the user has requested additional input fields for new values or new rows, all input fields received from the Object Property Edit web page are checked against the data in the database 22. If any value is different, code (e.g., JavaScript code) is generated to update the field to the user entered value after the Object Property Edit web page loads, block 194. The previous steps will only place values currently in the database 22 into the input fields. The code generated in this step will update any changed values to the last user entered values. By initially loading the database values and then updating to the last user entered values, a web browser's 20 ability to reset fields to their initial database values is maintained. Processing may then end and continue in FIG. 7B when the user enters data and submits the Object Property Edit web page.

With reference to FIG. 7B, shown is a flowchart illustrating the database update processing of the Object Property Edit web page. This processing may be performed by a receiver CGI program. User additions and changes and submission of the Object Property Edit web page are received, block 196. A first property/row id is obtained from the passed input, block 198. Processing may determine if this row is for a new/different property, block 200. If the row is for a new or different property then a database query may be performed to determine if the property pre-text in the database 22 is different from the pre-text received from the Object Property Edit web page processing, block 202. If the property pre-text is different (i.e., the user has changed the pre-text), the property pre-text in the database 22 is inserted, updated, and/or deleted as necessary in order to be replaced by the pre-text from the Object Property Edit web page, block 204. If the pre-text is not different, this step is skipped. A database query is performed to determine if the property row level data (row classification and organization) in the database 22 is different from the row level data from the Object Property Edit web page, block 206. If the property row level data is different (i.e., the user has changed the data), the property row level data in the database is inserted, updated, and/or deleted as necessary in order to be replaced by the row level data from the Object Property Edit web page, block 208. If the property row level data is not different, this step is skipped. If the row is not for a new or different property, then the steps shown in blocks 202-208 are skipped.

A database query is performed to select all property column definitions for the current property being processed, block 210. A first column id returned from the query is obtained, block 212. A first value in the current property row cell being processed is obtained from the passed data, block 214. A database query is performed to determine if the current cell value in the database 22 is different from the cell value from the Object Property Edit web page, block 216. If the current cell value is different (i.e., the user has changed the value), the cell value in the database 22 is inserted, updated, and/or deleted as necessary in order to be replaced by the cell value from the Object Property Edit web page (i.e., the value entered by the user), block 218. If the current cell value is unchanged, this step is skipped.

With continued reference to FIG. 7B, database update processing of the Object Property Edit web page may determine if there are any more values within the current property row cell being processed, block 220. If so, processing returns to block 214 where information for the next cell value is obtained. If not, processing may determine if there are any more columns within the current property row being processed, block 222. If so, processing returns to block 212 where information for the next column is obtained. If not, processing may determine if there are any more rows within the current property being processed, block 224. If so, processing returns to block 198 where information for the next property row is obtained. If not, all rows for the current property have been processed and a database query is performed to determine if the property post-text in the database is different from the post-text received from the Object Property Edit web page, block 226. If the post-text is different, the property post-text in the database 22 is inserted, updated, and/or deleted as necessary in order be replaced by the post-text from the Object Property Edit web page (i.e., the post-text entered by the user), block 228. Otherwise, if the post-text is unchanged, this step is skipped.

Database update processing of the Object Property Edit web page may determine if there are any more properties within the passed input data, block 230. If so, processing returns to block 198 where information for the next property row is obtained. If not, the processing may end.

With reference now to FIGS. 8A-8B, shown are flowcharts illustrating processing of other database interface pages or screens, the Object Property Search web pages. The processing illustrated in FIGS. 8A-8B may be performed by database application framework 10, e.g., by user interface software 12 (e.g., a creator CGI program and a receiver CGI program, respectively). As mentioned above, the Object Property Search web pages are an example of a variable format, data entry page for database search. Similar processing may be performed for other variable format, data entry pages for database search.

The Object Property Search web pages allow a user to enter property value search criteria and to display the object property rows which match those search conditions. With reference now to FIG. 8A, shown is the data entry web page processing. This processing may be performed by a creator CGI program. A user request for the Object Property Search web page is received, block 240. Input received with the request may include a list of objects to search and a list of properties to search. These items are selected via other web pages.

A first property id is obtained from a passed property id list, block 242. A database query is performed to select all property column definitions for the current property, block 244. A first column id returned from the query is obtained, block 246. Search data entry fields are displayed based on the column data type (as above), block 248. HTML code may be output to display the input fields for the user to input the property search data. The fields displayed are based on the data type of the property column, and may be as follows (data type followed by: fields):

Number: Criteria select list, operator select lists, and text or select list input fields for lower and upper numeric entry.
Text: Criteria select list, operator select list, and text or select list input fields for text entry.
Image: Criteria select list, operator select lists, and text input fields for image title and URL entry.
Date: Criteria select list, operator select lists, and text and select list input fields for year, month, day, hour, minute, and second entry.
Latitude/Longitude: Criteria select list and text input fields for latitude and longitude range entry.
Latitude: Criteria select list and text input fields for latitude range entry.
Longitude: Criteria select list and text input fields for longitude range entry.

With continued reference to FIG. 8A, processing may determine if there are any more columns in the current property being processed, block 250. If so, processing returns to block 246 where information for the next column is obtained. Otherwise, processing may determine if there are any more properties to process, block 252. If so, processing returns to block 242 where information for the next property is obtained. Otherwise, processing may display metadata search data entry fields on the Object Property Search web page for the user to input search data, block 254. HTML code may be output to display the input fields for the user to input metadata search data. The fields displayed may be for priority, source reliability, comments, timestamps, and users (e.g., to search for a specific user's created property). The processing ends, but may continue in FIG. 8B when the user enters data and submits the Object Property Search web page.

With reference now to FIG. 8B, shown is a flowchart illustrating search results web page processing. This processing may be performed by a receiver CGI program. A user search request is received, block 256. As shown, the user submits the search request by entering search data on the Object Property Search web page and submitting the web page. The search data input by the user may include the ids of the objects to search, the ids of the properties and columns to search, any relational operators (equal to, less than, greater than, matches, etc.) and values to search for, and an output type indicator.

An initial text for a database query statement to be generated is constructed, block 258. At this point the statement will constrain the search to the selected objects and properties. The query statement may be a SQL query text.

A first property/column id is obtained from the passed input, block 260. Text is appended to the query statement to constrain the search based on any current user entered relational operators and values being processed, block 262. Processing may determine if there are any more property column search values, block 264. If so, processing returns to block 260 where information for the next property column operators and values is obtained. If not, processing may determine which search output type the user has requested, block 266.

If the user has selected to view matching property rows, the generated query is executed to find all object property rows that match the user entered search criteria, block 268. A first matching property row id returned from the query is obtained, block 270. Processing may determine if this row is for a new/different property than the last processed row, block 272. If for a new or different property, a new table with column headers may be generated and displayed on an Object Property Search Results web page, block 274. HTML code may be output to start the display of an HTML table with the first row containing the property column names. If the row is for the same property, this step is skipped. A database query is performed to select and display on the Object Property Search Results web page all values in each cell of the matching property row, block 276. HTML code may output to display these values in an HTML table row. The processing may determine if there are any more matching property rows returned from the query, block 278. If so, processing returns to block 270 where information for the next matching property row is obtained. If not, processing ends.

If the user selected to view the matching objects, the generated query is executed to find all objects that match the user entered search criteria, block 280. An Object Properties Search Results web page that displays matching objects instead of matching property rows may be activated and displayed, block 282. The matching objects returned from the query are passed to and displayed on this web page.

With reference now to FIGS. 9-10, shown are flowcharts illustrating exemplary trigger 14 processing. FIG. 9 illustrates processing of Before Each Row triggers 14, while FIG. 10 illustrate processing of After Statement triggers 14. These are examples of triggers 14 used for data validation and cascading row labels in database application framework 10. These triggers 14 are used to clean and validate data to be inserted or updated into the database 22, to calculate the row label for the row being inserted or updated, and to cause all immediate child tables to update themselves in order to re-calculate their row labels.

With reference now to FIG. 9, a Before Each Row trigger is executed each time a row is inserted or updated in the Objects table. Old and new values for each column in the row being inserted or updated in the database 22 are received from a inserting or updating statement, block 300. The old and new values for each column in the row are the inputs to the trigger. Object name field is cleaned, block 302. Text cleaning includes removing non-displayable characters, compressing any multiple consecutive spaces to a single space, and removing leading or trailing spaces. Object name classification field is cleaned, block 304. Classification cleaning includes removing non-displayable characters, compressing any multiple consecutive spaces to a single space, removing spaces in improper places, removing leading or trailing parentheses, changing all characters to upper case, and finally sorting each component of the classification. Object short name field is cleaned, block 306. Object short name classification field is cleaned, block 308. Overall object classification field is cleaned, block 310

Processing of the Before Each Row trigger checks object name classification, determining if there are any name classification problems, block 312. A classification check includes checking that all of the components of the classification are valid. If the name classification is okay, the object short name classification is checked, block 314. If the short name classification is okay, the object overall classification is checked, block 316. If any classification (name, short name or overall) problems are found, an error exception is raised to cause the originating insert or update statement to fail and terminate, block 318.

Processing may determine if the row is being inserted or if the row is being updated and the object name field is changing, block 320. If either condition is satisfied, the object name field is saved in a global area (e.g., an array in a PL/SQL package body) so that it can be accessed by the "after statement" trigger (see FIG. 10), block 322.

With continuing reference to FIG. 9, processing of the before each row trigger 14 may determine if label security (e.g., OLS) is being used and the Objects table is to be access controlled, block 324. If not, the processing is complete. If so, a database query is performed to obtain the row label of the parent row in the object types table, block 326. A database query is performed to obtain the row label of the parent row in the object categories table, block 328.

The following row labels and textual classification values are summed and the result is stored into the new row label column, block 330, which overrides any value that was in the original insert or update statement:

Parent object types row label (obtained in block 326);
Parent object categories row label (obtained in block 328);
Object name classification text string;
Object short name classification text string; and,
Object overall classification text string.

Processing may determine if the originating statement was an update statement and if the row label calculated in block 330 is different from the old row label, block 332. If so, the object id value is saved in a global area (e.g., an array in a PL/SQL package body) so that it can be accessed by the "after statement" trigger (see FIG. 10), block 334. Otherwise, processing the before each row trigger 14 ends.

With reference now to FIG. 10, an After Statement trigger 14 is executed after each insert or update statement on the Objects table is completed. A first object name field saved in the global area by the Objects table before each row trigger 14 (see FIG. 9 above) is obtained, block 340. A database query is performed to count the number of rows in the table that contain the object name obtained in block 340 (ignoring case, punctuation, and spaces), block 342. If the name is not a duplicate there will be one row. Otherwise, there will be more than one row.

Processing determines if there is more than one row with a matching name (i.e., count is greater than 1), block 344. If so, an error exception is raised to cause the originating insert or update statement to fail and terminate, block 346. Otherwise, processing may determine if there are any more object names saved in the global area, block 348. If so, processing returns to block 340 to obtain the next name.

Otherwise, processing determines if label security (e.g., OLS) is being used and the Objects table is to be access controlled, block 350. If not, processing ends. If label security is used, a first object id saved in the global area by the Objects table before each row trigger 14 (see FIG. 9 above) is obtained, block 352.

A database update statement is issued to update each child row in each immediate child table, block 354. This will cause all child rows to re-calculate their row labels. All update statements update the object id to the objects current value. The child tables updated are as follows:

Link Max Objects;
Link Notations;
Object Associations;
Object Keywords;
Object Properties;
Object Property Groups;
Object Text;
Property Group Object Types; and,
User Comments.

The processing may determine if there are any more object ids saved in the global area, block 356. If so, processing returns to block 352 to obtain the next object id. Otherwise, processing the trigger 14 ends.

Figure 11:
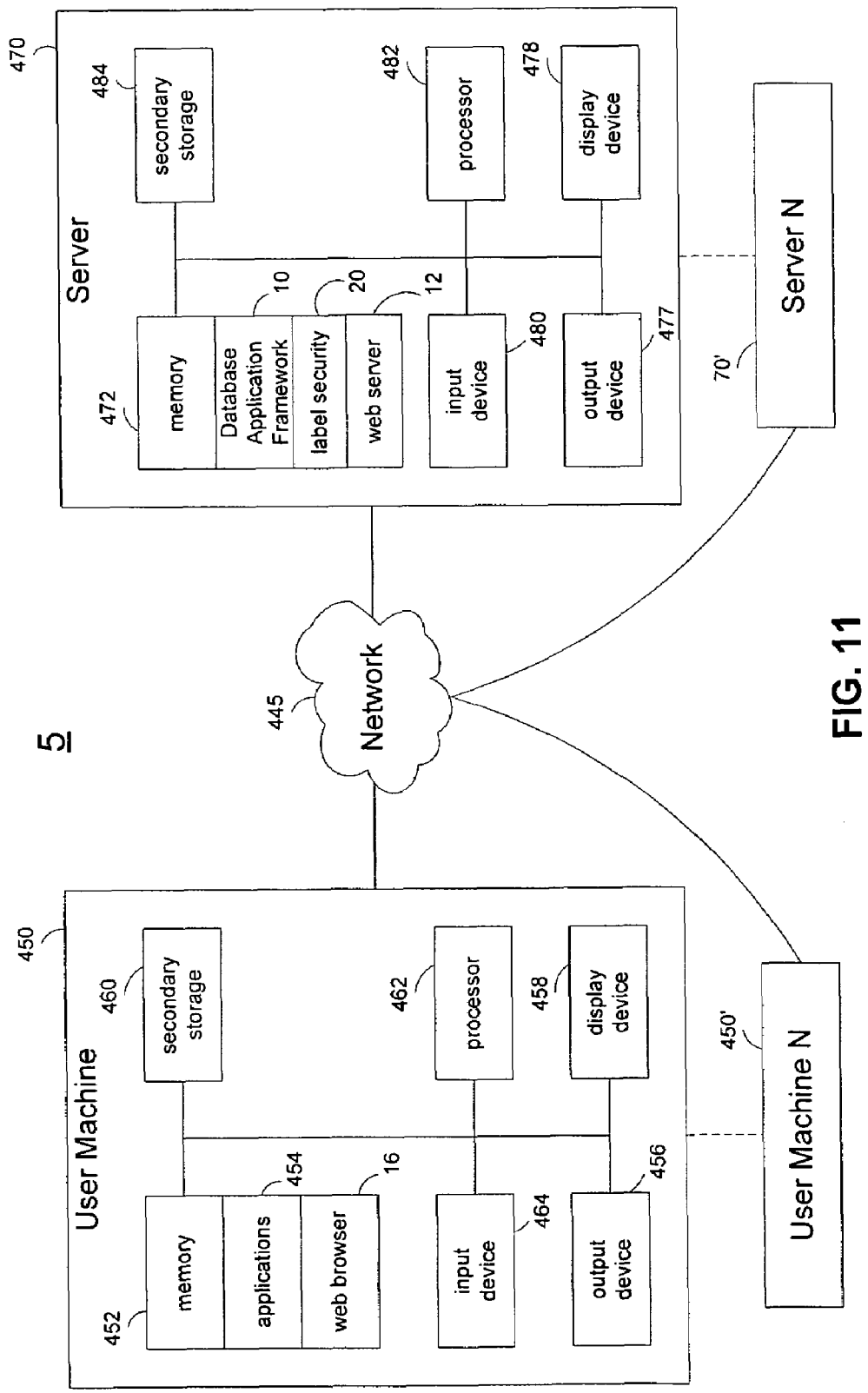
FIG. 11 is a block diagram illustrating exemplary hardware components for implementing an embodiment of a system and method for rapid database application deployment and use.

With reference now to FIG. 11, shown is a block diagram illustrating exemplary hardware components for implementing a system and method for rapid database application deployment and use. The embodiment shown in FIG. 11 includes database application framework 10 and database 22 located on a server 470 accessed through Internet (or other network 445) by a user using a web browser 16 at user machine 450. Alternatively, database application framework 10 and database 22 may be resident on the same user machine used by the user. System for rapid database application deployment and use 5 includes a user machine 450 connected with a network 445 such as the Internet, providing a network connection for rapid database application deployment and use.

Users at user machines 450 interact with a server 470 to rapidly develop, edit, search, view and otherwise access (use) relational databases. Server 470 may provide and maintain a database interface web site with user interface web pages as described above. The user interface web pages allow the user to access database application framework 10 to develop, edit and access (use) relational databases. Only two user systems are shown for illustrative purposes only; system 5 may include many user machines and may be scalable to add or delete user machines to or from the network.

With continued reference to FIG. 11, user machine 450 illustrates typical components of a user machine User machine 450 typically includes a memory 452, a secondary storage device 460, a processor 462, an input device 464, a display device 458, and an output device 456. Memory 452 may include random access memory (RAM) or similar types of memory, and it may store one or more applications 454, and web browser 16, for execution by processor 462. Secondary storage device 460 may include a hard disk drive, floppy disk drive, CD-ROM drive, or other types of non-volatile data storage. Processor 462 may execute applications stored in memory 452 or secondary storage 460, or received from the Internet (e.g., from the server 470 as a web-based application) or other network 445, and the processing may be implemented in software, such as software modules, for execution by computers or other machines.

As described herein, database application framework 10 provides graphical user interfaces (GUIs) as web pages through which users define properties and objects, enter data and information, and otherwise execute the processing described herein. Input device 464 may include any device for entering information into machine 450, such as a keyboard, mouse, cursor-control device, touch-screen, microphone, digital camera, video recorder or camcorder. The input device 464 may be used to enter information into the web pages during performance of the methods, as described herein. Display device 458 may include any type of device for presenting visual information such as, for example, a computer monitor or flat-screen display. The display device 458 may display the web pages described herein. Output device 456 may include any type of device for presenting a hard copy of information, such as a printer, and other types of output devices include speakers or any device for providing information in audio form.

With continued reference to FIG. 11, web browser 16 may be used to access the database application framework 10 and display various user interface web pages through which the user can enter or view data and information, as described herein. Examples of web browsers 16 include the Netscape Navigator program and the Microsoft Internet Explorer program.

Examples of user machines 450 for interacting include personal computers, laptop computers, notebook computers, palm top computers, network computers, or any processor-controlled device capable of executing a web browser or other type of application for interacting with the system.

Server 470 typically includes a memory 472, a secondary storage device 484, a processor 482, an input device 480, a display device 478, and an output device 476. Memory 472 may include RAM or similar types of memory, and it may store one or more applications such database application framework 10, web server 18, label security 20 (not shown) and database software (not shown) for execution by processor 482. Secondary storage device 484 may include a hard disk drive, floppy disk drive, CD-ROM drive, or other types of non-volatile data storage. Processor 482 may execute database application framework 10 (including user interface software 12 and triggers 14), web server 18, label security 20 and database software, which are stored in memory 472 and/or secondary storage 484, or received from the Internet or other network 445. Database application framework 10 or other applications preferably include instructions executable to perform the methods described herein. Input device 480 may include any device for entering information into server 470, such as a keyboard, mouse, cursor-control device, touch-screen, microphone, digital camera, video recorder or camcorder. Display device 478 may include any type of device for presenting visual information such as, for example, a computer monitor or flat-screen display. Output device 476 may include any type of device for presenting a hard copy of information, such as a printer, and other types of output devices include speakers or any device for providing information in audio form.

With continued reference to FIG. 11, server 470 may store a database structure (e.g., database 22) in secondary storage 484, for example, for storing the actual database tables used by database application framework 10 to store the virtual relational database structures and virtual relational database implementations as described herein. Using the actual database structure, database application framework 10 can be used to rapidly develop virtual relational database implementations and to provide access to these databases as described herein. Alternatively, database structure (database 22) may be maintained on a separate server (e.g., a database server), as may other components of system 5 (e.g., label security 20 and web server 18.

Also, processor 482 may execute database application framework 10 in order to provide the functions described in this specification, and the processing may be implemented in software, such as software modules, for execution by computers or other machines. The processing may provide and support web pages and other GUIs described in this specification and otherwise for display on display devices associated with the user machines 450. The GUIs may be formatted, for example, as web pages in HyperText Markup Language (HTML), Extensible Markup Language (XML) or in any other suitable form for presentation on a display device depending upon applications used by users to interact with the system 5.

With continued reference to FIG. 11, the GUIs preferably include various sections, to provide information or to receive information or commands. The term "section" with respect to GUIs refers to a particular portion of a GUI, possibly including the entire GUI. Sections are selected, for example, to enter information or commands or to retrieve information or access other GUIs. The selection may occur, for example, by using a cursor-control device to "click on" or "double click on" the section; alternatively, sections may be selected by entering a series of key strokes or in other ways such as through voice commands or use of a touch screen or similar functions of displaying information and receiving information or commands.

Figure 12:
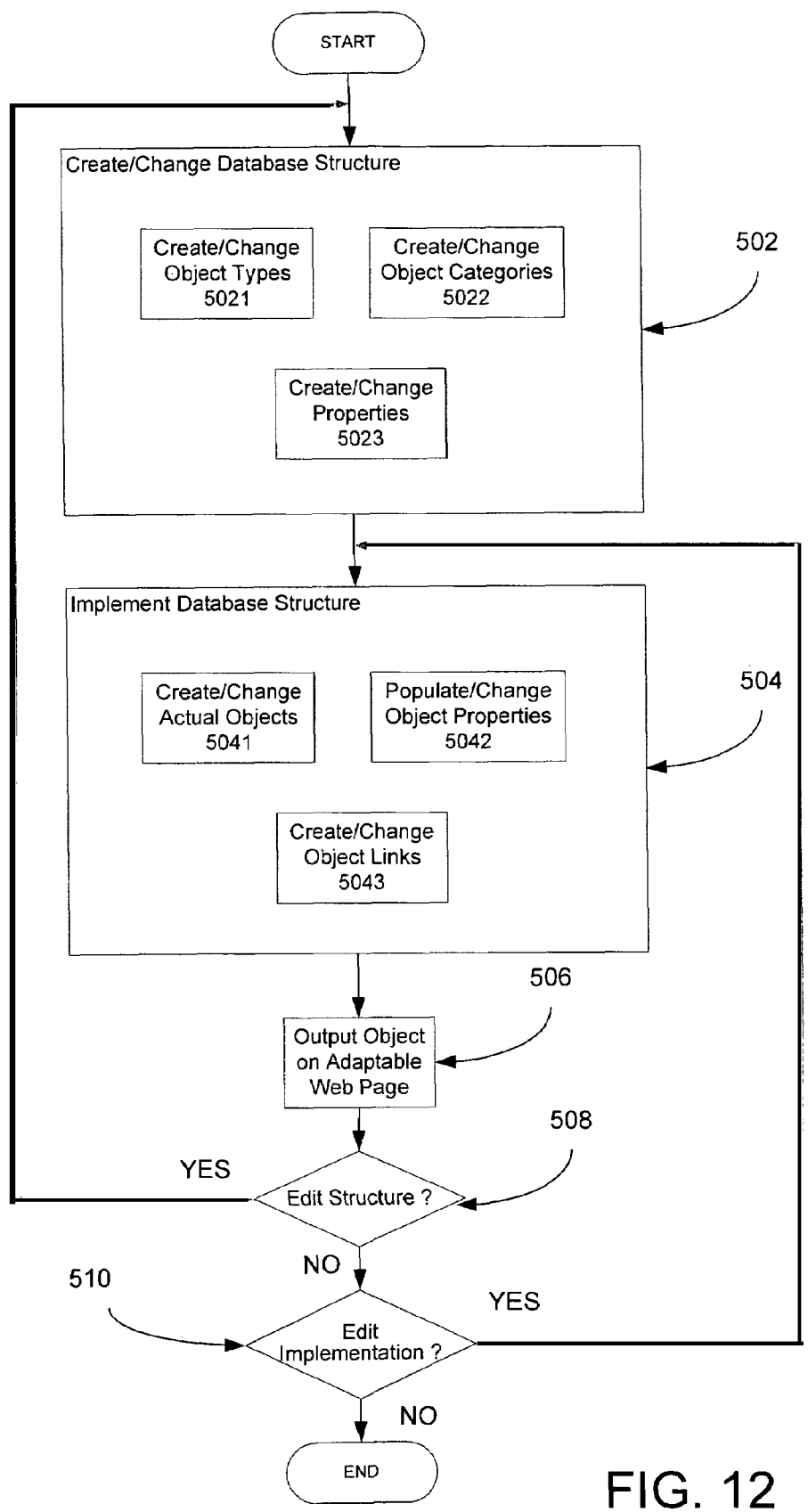
FIG. 12 is a flowchart illustrating an embodiment of a method for rapid database application deployment and use.

Although only one server 470 is shown, system 5 may use multiple servers as necessary or desired to support the users and may also use back-up or redundant servers to prevent network downtime in the event of a failure of a particular server. In addition, although machine 450 and server 470 are depicted with various components, one skilled in the art will appreciate that these machines and the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as machine 450 and server 470, to perform a particular method described herein With reference now to FIG. 12, shown is an embodiment of a method for rapid database application deployment and use 500. Method 500 may include steps performed as described above (e.g., with reference to FIGS. 3-10). The steps described herein are only illustrative and need not be performed each time a virtual relational database implementation is developed and/or used using database application framework 10. Method 500 starts, typically with a user starting web browser 16, entering a URL for web server 18, starting and logging in to database application framework 10 (e.g., through a database application framework 10 login web page). The following steps may be performed through the users access and interaction with user interface web pages generated and displayed by database application framework 10, specifically user interface software 12.

A virtual relational database structure is created/changed, block 502. When a new relational database (a database implementation or application) is created, at least some portion of its virtual structure is previously created (based on definitions input by a user) before the new database is used. Creating/changing the virtual relational database structure 502 may include creating/changing one or more object types, block 5021, creating/changing one or more object categories, block 5022, and creating/changing one or more properties, block 5023. Creating/changing an object type 5021 may include database application framework 10 receiving object type definitions as user input from a user interface web page. A new object type may be created from the received definitions or an existing object type updated with the definitions. Typically, object types are not changed from one object type to another, but characteristics of the object type may be changed (e.g., changing an object type name from "car" to "automobile"). Creating/changing an object category 5022 may include database application framework 10 receiving object category definitions as user input from a user interface web page. New categories may be created or existing categories updated. Creating/changing a property 5023 may include database application framework 10 receiving property definitions as user input from a user interface web page. New properties may be created or existing ones updated. The property definitions may also include data associating the property to one or more object types. The virtual relational database structure, e.g., the object types, categories, and properties, is stored in an existing static relational database structure.

The virtual relational database structure is implemented, block 504. The implementation 504 of the virtual relational database structure creates the new relational database (the database implementation or application). Multiple relational databases may be implemented 504 from the same virtual relational database structure. Implementing the virtual relational database structure 504 may include creating/changing one or more objects 5041, populating/changing object properties 5042, and creating/changing object links 5043. The creating/changing may include database application framework 10 receiving user inputs from user interface web pages and storing the input in a table structure in database 22, as described above. For example, creating/changing an object 5041 may include database application framework 10 receiving object data as user input from a user interface web page. A new object may be created or an existing object updated with the user input data. In order to create an object, a user first selects an object type. Populating/changing object properties 5042 may include database application framework 10 receiving property data for an object as user input from a user interface web page. A property for a new or existing object may be populated or updated with the user input. The properties that may be used for an object are determined by the properties associated with the object type of the object. In an embodiment, objects and properties are both associated with object types. An object of a certain object type can only use properties that are of the same object type. However, an object does not have to use all properties associated with that object type—it can use any number of them. Alternatively, properties may not be associated with object types. Thus, a user creating and object would not be presented with a list of properties associated with the object type, but may be presented with a list of all defined properties from which to select. Creating/changing object links 5043 may include database application framework 10 receiving data linking an object to one or more other objects as user input from a user interface web page. A new object link may be created or an existing object link updated with the user input. If label security 20 is used, these steps may include trigger processing as shown in FIGS. 9-10 above. As noted above, implementing the relational database structure 504 may be performed before the entire relational database structure 504 is created. The virtual relational database implementations, e.g., the objects, populated properties, links and their data, is also stored in an existing static relational database structure.

With continued reference to FIG. 12, if a user wants to view an object, an object is output for display on an adaptable web page, block 506. This may include receiving a user input/selection of an object, retrieving object data from database 22, adapting object display web page to current object data (see above), and outputting adapted object display web page. If additional properties, data, links, etc., have been added to the object (see block 508 and 510) since it was previously displayed, the object display web page automatically adapts to display the additional properties.

Method 500 may determine if the user wants to edit the virtual database structure, block 508. For example, database application framework 10 may receive a user input indicating that the user wants to add a column to a property. The user input may be a selection on a web page (e.g. a property edit page). If the user wants to change the database structure, the method 500 flow loops back to block 502. Changing the virtual database structure 502, as described above, may include creating or changing object types 5021, creating or changing object categories 5022, creating or changing properties 5023. If, for example, a user wanted to edit a property, the Property Edit Page may be output for display and the processing performed as discussed above. The property may be displayed on an adaptable web page output by database application framework 10, changes made to the property based on user input, and the property re-displayed on the adaptable web page output by database application framework 10, immediately displaying the changes to the property as discussed above. Likewise, object type web pages output for display by database application framework 10 adapt to and display any new object types that are created.

If the user edits the database structure, the database implementation may be changed 504 as well. For example, if the user edits a property to add a column, the user may want to input additional data for the new column. The populated property for an actual object may be displayed on an adaptable web page output for display by database application framework 10 with the new, blank column as part of populating/changing a property 5042.

Method 500 may determine if the user wants to edit the database implementation, block 510. The user may want to edit the database implementation to change or create new objects, change or populate new properties, change or create new object links, etc. For example, database application framework 10 may receive a user input indicating that the user wants to add an object link The user input may be a selection on a web page (e.g., the object display web page).

As noted above, FIG. 12 is merely an illustration of an embodiment of an exemplary method 500 for rapid database application deployment and use. While FIG. 12 illustrates important features for rapid database application deployment and use, the actual development and use of a relational database using database application framework 10 may include different and/or additional steps and functions as described herein. There are a nearly unlimited number of combinations of steps that may be performed when a user uses database application framework 10 to develop and use a relational database.

As discussed herein, the system and method for rapid database application deployment and use provides a number of novel advantages and features over existing database development methodologies and tools. For example, system and method 5 provides: user defined object types, which allow flexibility in the types of "things" (objects) to store data for; user defined objects, which allow the user to create the things to store data for; user defined object properties, which allow the user to define groups of data to be stored for objects; adapting database interface web pages, i.e., web pages to view, edit, and search the database adapt to additions and changes in the user defined structure, specifically to object types and property definitions; and, system and method 5 works with or without label security, such as OLS. The same web page software is used whether label security such as OLS is installed or not. Label security provides capability to control access to rows in tables based on data security markings and user security level.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A system for rapid database application deployment and use, comprising:
   a physical relational database that includes a fixed database structure, wherein the fixed database structure includes one or more pre-defined tables in which may be stored database application structures, the structure of the fixed database structure does not change when an end-user creates or modifies the database application structures, and the fixed database structure contains:
   one or more database application structures, wherein each database application structure is stored in the fixed database structure, each database application structure is presented to the end-user as an actual database structure without being implemented as an actual database structure in the physical database, each database application structure may be configured for a specific application, the end-user may use each database application structure to store data relevant to a specific application, and the end-user may add object types and object properties to the one or more database application structures after using the one or more database application structures to store data, each database application structure including:
   one or more object types, wherein object types are definitions of types of objects for which data may be stored and the end-user may create and modify the one or more object types, including adding object types to a database application structure;
   one or more object properties, wherein object properties are definitions of types of data that may be stored for objects, each object property includes one or more columns, each column with a column name, a column size and a data type, and the end-user may create and modify the one or more object properties, including adding object properties to the database application structure;
   one or more actual objects that are each based on the one or more object types, wherein each actual object is an entity to which actual data stored in one or more populated properties is related, each actual object has a unique name and is assigned an object type, and each actual object may be created and modified by the end-user; and
   one or more populated properties that are based on the object properties, wherein each populated property includes data related to one of the one or more actual objects, each populated property includes one or more columns, each column with a column name, a column size and a data type, each populated property may be created and modified by the end-user, and the data in each populated property may be entered and modified by the end-user; and
   a computer connected to the physical relational database, including a processor and a memory, the memory comprising a database application framework that is executed by the processor and communicates with the physical relational database, the database application framework enables the end-user to create and modify the one or more database application structures, wherein the database application framework:
   displays one or more user interface displays on which the end-user may enter inputs to create and modify database application structures, such definitions and modifications including the addition of new object types, new object properties, and columns to an existing object property;
   displays one or more user interface displays that displays the one or more object types, object properties, actual objects and populated properties so that the one or more database application structures appear to be actual relational databases;
   processes inputs received from the user interface displays to implement end-user creation of and modifications to the one or more database application structures, wherein the database application framework automatically adapts the user interface pages to immediately display modifications to the one or more database application structures, including the immediate display of the addition of new object types, new object properties, and columns to an existing object property; and wherein the database application framework further includes triggers, wherein the triggers validate data received from the user interface displays and process data security markings that indicate end-user security levels that have permission to access data in the database application structure.

2. The system of claim 1 wherein the user interface displays are web pages.

3. The system of claim 1 wherein the database application framework includes:
one or more creator Common Gateway Interface (CGI) programs, wherein creator CGI programs create and output user interface displays; and
one or more receiver CGI programs, wherein receiver CGI programs receive and process end-user inputs from the user interface displays.

4. The system of claim 1 further including a label security application that labels data in at least one of the one or more database application structures with data security markings indicative of an end-user security level necessary to access the data and that works with the database application framework to control access to the data based on the data security markings.

5. The system of claim 1 further comprising a host server, which hosts the physical relational database, a user machine and a network connection between the user machine and the host server, wherein the user machine includes a web browser that displays the user interface displays that enable an end-user to view, modify and search the database application structure.

6. The system of claim 1 in which the one or more actual object include association notations that include phrases describing associations between objects.

7. The system of claim 1 wherein the database application structure further includes one or more link objects that define an association between actual objects.

8. The system of claim 1 wherein the database application structure further includes object categories.

9. The system of claim 1 wherein the physical relational database includes a plurality of database application structures.

10. The system of claim 9 wherein the plurality of database application structures include unrelated database application structures.

11. The system of claim 9 wherein the plurality of database application structures are stored in the same fixed database structure.

12. A computer readable medium for rapid database application deployment and use comprising:
a database application framework that includes instructions for execution by a processor, wherein the database application framework enables an end-user to create and modify a database application structure that is stored in a fixed database structure in a physical database and the database application framework further includes triggers, wherein the triggers validate data received from the displays and process data security markings that indicate end-user security levels that have permission to access data in the database application structure, wherein the fixed database structure includes one or more pre-defined tables, and wherein the database application structure is presented to the end-user as actual relational database structure without being implemented as actual relational database structure in the physical database, the instructions including instructions for:

displaying editing displays on which the end-user may enter inputs to create and modify a database application structure, wherein the database application structure may be configured for a specific application, the end-user may use the database application structure to store data relevant to the specific application, and the end-user may add object types and object properties to the one or more database application structures after using the one or more database application structures to store data, wherein the displaying editing displays includes displaying object type editing displays on which the end-user may enter inputs to create and modify object types, wherein object types are definitions of types of objects for which data may be stored and the end-user may enter inputs to add object types to the database application structure;

displaying object property editing displays on which the end-user may enter inputs to create and modify object properties, wherein object properties are definitions of types of data that may be stored for objects, each object property includes one or more columns, each column with a column name, a column size and a data type, and the end-user may enter inputs to create and modify object properties, including adding object properties to the database application structure;

displaying object editing displays on which the end-user may enter inputs to create and modify actual objects, wherein each actual objects is based on an object type, each actual object is an entity to which actual data stored in one or more populated properties is related, and each actual object has a unique name and is assigned an object type; and displaying property populating displays on which the end-user may enter inputs to create and modify populated properties, wherein each populated property is based on an object property, each populated property includes data related to one of the one or more actual objects, each populated property includes one or more columns, each column with a column name, a column size and a data type, and the inputs may include data to be entered into a populated property and inputs to add a column to a populated property;

receiving inputs from the displays;

processing the received inputs to implement end-user creation of and modifications to the database application structure, wherein the processing includes:
storing created and modified database application structure in the one or more tables of the fixed database structure, wherein the structure of the fixed database structure does not change when an end-user creates or modifies the database application structure; and automatically adapting displays to immediately display modifications to the database application structure, including immediately displaying the addition of new object types, new object properties, and columns to an existing object property; and, displaying viewing displays on which the database application structure is displayed, wherein the database application structure is presented to the end-user as a relational database structure.

13. The computer readable medium of claim 12 wherein the displays are web pages.

14. The computer readable medium of claim 12 wherein the database application framework includes instructions for communicating the processed end-user inputs to a physical relational database.

15. The computer readable medium of claim 12 further comprising a label security application that labels data in the physical relational database with data security markings indicative of an end-user security level necessary to access the data and that works with the database application framework to control access to the data based on the data security markings.

* * * * *